US010051048B2

(12) United States Patent
Haebler et al.

(10) Patent No.: US 10,051,048 B2
(45) Date of Patent: Aug. 14, 2018

(54) CONTENT DISTRIBUTION USING AD HOC MESH NETWORKS

(71) Applicant: Comcast Cable Communications, LLC, Philadelphia, PA (US)

(72) Inventors: Marcus Haebler, Audubon, PA (US); John Marquart, Wilmington, DE (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 240 days.

(21) Appl. No.: 15/179,596

(22) Filed: Jun. 10, 2016

(65) Prior Publication Data

US 2017/0359412 A1   Dec. 14, 2017

(51) Int. Cl.
*H04N 21/231* (2011.01)
*H04L 29/08* (2006.01)
*H04W 84/18* (2009.01)
*H04W 28/08* (2009.01)

(52) U.S. Cl.
CPC ........ *H04L 67/1044* (2013.01); *H04L 67/06* (2013.01); *H04L 67/1002* (2013.01); *H04L 67/1059* (2013.01); *H04N 21/231* (2013.01); *H04N 21/23103* (2013.01); *H04W 28/08* (2013.01); *H04W 84/18* (2013.01)

(58) Field of Classification Search
CPC . H04L 67/1044; H04L 67/06; H04L 67/1059; H04L 67/1002; H04L 63/0421; H04W 84/18; H04W 84/08; H04N 21/23103; H04N 21/231; H04N 21/64738; H04N 21/23109; H04N 7/147; G11B 27/034; G06Q 30/02; G06F 3/065; G06F 21/6218; G06F 17/30174
See application file for complete search history.

(56) References Cited

U.S. PATENT DOCUMENTS

| 8,848,593 B1 | 9/2014 | Zhou et al. | |
| 2013/0027552 A1* | 1/2013 | Guzik | G11B 27/034 348/143 |

(Continued)

OTHER PUBLICATIONS

Oct. 25, 2017—Extended European Search Report—EP 17175518.4.

(Continued)

*Primary Examiner* — Le H Luu
(74) *Attorney, Agent, or Firm* — Banner & Witcoff, Ltd.

(57) ABSTRACT

Aspects discussed herein relate to systems, apparatuses, and methods for providing content distribution via a breadth-first approach for peer-to-peer file sharing in a temporary ad hoc mesh network. For example, a peer-to-peer orchestrator may receive requests for the same asset from multiple mobile devices, determine which of the mobile devices are likely to travel along the same route at the same time, group them together and cause transmission of different asset parts of the requested asset to different mobile devices in the group. If the mobile devices in the group lose connection with the peer-to-peer orchestrator, they may form an ad hock mesh network and retrieve asset parts from one another. If the group reconnects with a peer-to-peer orchestrator, additional asset parts of the asset may be transmitted to the group and the process may repeat so that each mobile device may obtain each of the asset parts.

20 Claims, 9 Drawing Sheets

(56) References Cited

U.S. PATENT DOCUMENTS

| | | | |
|---|---|---|---|
| 2013/0166625 A1* | 6/2013 | Swaminathan | H04N 21/64738 709/203 |
| 2013/0238426 A1* | 9/2013 | Mukhopadhyay | G06Q 30/02 705/14.49 |
| 2014/0036023 A1* | 2/2014 | Croen | H04N 7/147 348/14.01 |
| 2014/0250300 A1* | 9/2014 | Runkis | G06F 21/6218 713/165 |
| 2014/0310241 A1* | 10/2014 | Goyen | G06F 17/30174 707/634 |
| 2014/0366051 A1* | 12/2014 | Cronk | H04N 21/23109 725/14 |
| 2016/0057227 A1* | 2/2016 | Kripalani | G06F 3/065 709/223 |
| 2017/0041296 A1* | 2/2017 | Ford | H04L 63/0421 |

OTHER PUBLICATIONS

Nandan, Alok et. al.—"Co-operative Downloading in Vehicular Ad-Hoc Wireless Networks"—Second Annual Conference on Wireless On-Deman Network Systems and Services (WONS'05)—Jan. 19, 2005.

Gerla, Mario et. al.—Vehicular Networks and the Future of teh Mobile Internet—Computer Networks—2010.

\* cited by examiner

CONTENT DISTRIBUTION USING AD HOC MESH NETWORKS

BACKGROUND

Frequently, when traveling or commuting from one place to another, individuals may wish to download an asset such as a movie to their personal mobile device (e.g., smartphone, tablet, laptop, etc.). In many instances, the individual may request to download the asset when they only have a limited timeframe during which to download the asset such as when they are waiting to board a train at a train station or waiting to board an airplane at an airport, at which point they may lose connectivity to a router or base station providing the asset once they board. In many instances, there is insufficient time to download the entire asset resulting in the inability of the personal mobile device to playback the asset in its entirety.

The problem is exacerbated for highly popular assets such as a movie recently made available for download. In such instances, many individuals may be requesting and downloading the asset at the same time or at least during overlapping time periods. As a result, due to the greater network bandwidth consumption of servicing multiple requests for the asset, even less of the asset might be downloaded to the individuals' personal mobile devices. In some cases, an asset might not be stored in a local cache of an edge server servicing the personal mobile devices. In such cases, the edge server must retrieve the asset from another location prior to transmitting the asset to the personal mobile devices. As a result, it may take more time for the personal mobile devices to obtain the asset from the edge server. Further, because the individuals are requesting the same asset, numerous redundant portions of the asset are being transmitted over the network to service the multiple requests, which results in unnecessary load and bandwidth consumption. In addition, the individual's cost for using cellular mobile data connections are typically higher than the costs for using other mobile connections (e.g., wireless local area network (WLAN), Bluetooth, etc.). Because the individual's personal mobile device is forced to use the cellular mobile data connection once it loses connection with another network (e.g., WLAN), the individual's costs for obtaining the asset are unnecessarily high.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects discussed herein relate to systems, apparatuses, and methods for providing content distribution via a breadth-first approach for peer-to-peer file sharing in a temporary ad hoc mesh network. Such aspects permit individuals to obtain complete copies of assets while traveling or commuting from one place to another during which they may lose connectivity with an asset provider. Various features described herein may provide a peer-to-peer orchestrator which may receive requests for the same asset from multiple mobile devices, determine which of the mobile devices are co-located and likely to travel along the same route at the same time, group them together, and cause transmission of different asset parts of the requested asset to different mobile devices in the group. If the mobile devices in the group lose connection with the peer-to-peer orchestrator, they may form an ad hoc mesh network and retrieve asset parts from one another. If the group reconnects with a peer-to-peer orchestrator, additional asset parts of the requested asset may be transmitted to the group and the process may repeat so that each mobile device may obtain a complete copy (e.g., all of the asset parts) of the requested asset. In some cases, there may be multiple peer-to-peer orchestrators that each have the same functionality but have different locations (e.g., executed by different edge servers, access points, etc.). In one or more arrangements, a peer-to-peer orchestrator may be an add-on to an existing access point.

These features in the summary above are merely illustrative of the features described in greater detail below, and are not intended to recite the only novel features or critical features in the claims.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings identified above, which form a part hereof, and in which is shown by way of illustration various embodiments in which aspects of the disclosure may be practiced. Other embodiments may be utilized and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
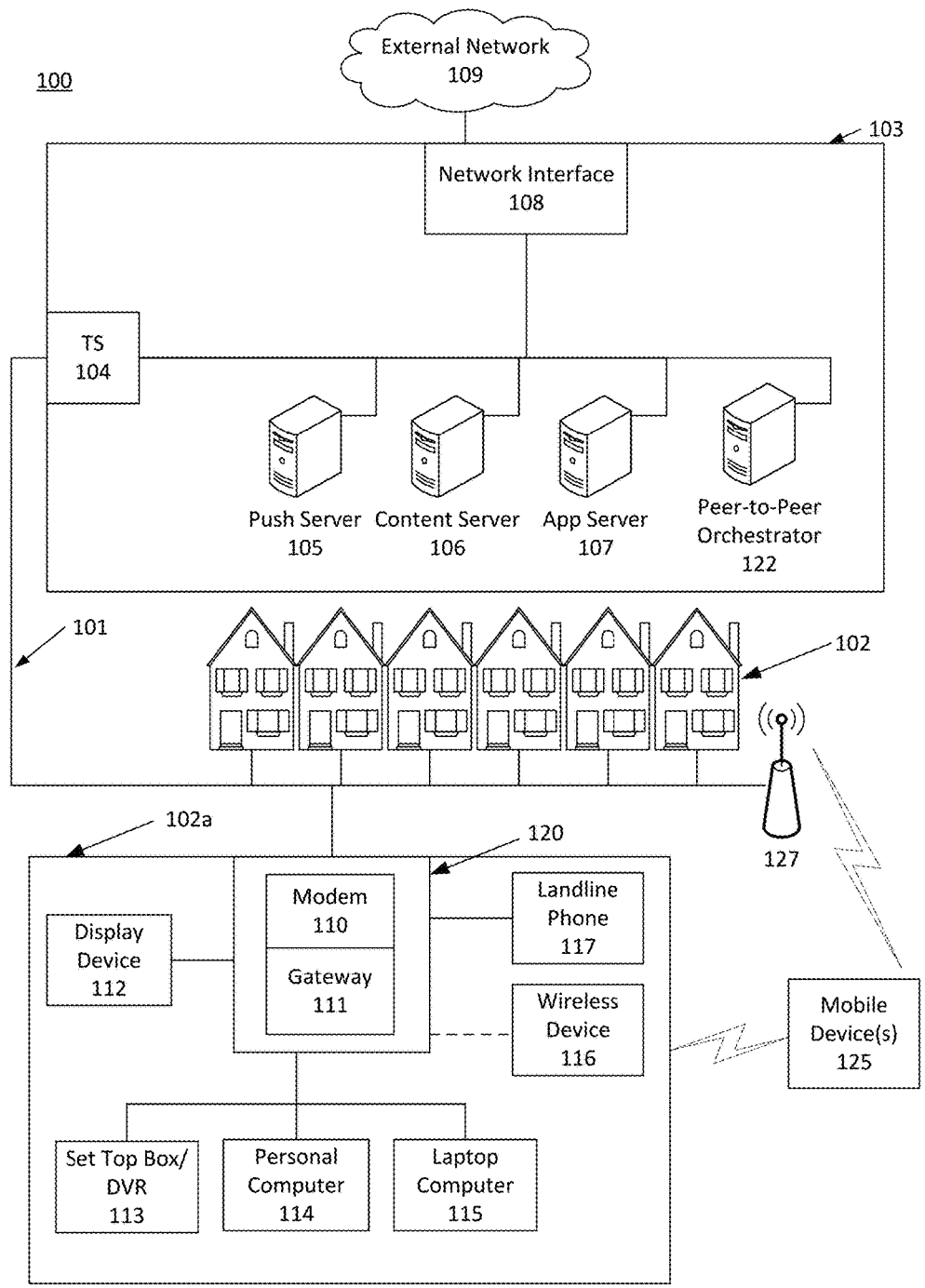
FIG. 1 depicts an illustrative information access and distribution network in accordance with one or more aspects as described herein.

FIG. 1 illustrates an example communication network 100 on which many of the various features described herein may be implemented. The communication network 100 may be any type of information distribution network, such as satellite, telephone, cellular, wireless, etc. One example may be an optical fiber network, a coaxial cable network, or a hybrid fiber/coax distribution network. The communication network 100 may use a series of interconnected communication links 101 (e.g., coaxial cables, optical fibers, wireless, etc.) to connect multiple premises 102 (e.g., businesses, homes, consumer dwellings, train stations, airports, etc.) to a local office 103 (e.g., a headend). The local office 103 may transmit downstream information signals onto the communication links 101, and each of the premises 102 may have a receiver used to receive and process those signals.

One of the communication links 101 may originate from the local office 103, and it may be split a number of times to distribute the signal to the various premises 102 in the vicinity (which may be many miles) of the local office 103. The communication links 101 may include components not illustrated, such as splitters, filters, amplifiers, etc. to help convey the signal clearly. Portions of the communication links 101 may also be implemented with fiber-optic cable, while other portions may be implemented with coaxial cable, other lines, or wireless communication paths. The communication links 101 may be coupled to a base station 127 configured to provide wireless communication channels to communicate with mobile device 125. The wireless communication channels may be Wi-Fi IEEE 802.11 channels, cellular channels (e.g., LTE), and/or satellite channels.

The local office 103 may include an interface 104, such as a termination system (TS). More specifically, the interface 104 may be a cable modem termination system (CMTS), which may be a computing device configured to manage communications between devices on the network of the communication links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding mobile devices 125 (e.g., cell phones, smartphone, tablets with cellular radios, laptops communicatively coupled to cellular radios, etc.).

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, the content server 106, and the application server 107 may be combined. Further, here the push server 105, the content server 106, and the application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more of the links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may be a set-top box (STB), digital video recorder (DVR), a digital transport adapter (DTA), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at premise 102a may be configured to provide wireless communications channels (e.g., IEEE 802.11 channels) to communicate with mobile device 125. As an example, a modem 110 (e.g., access point) or wireless device 116 (e.g., router, tablet, laptop, etc.) may wirelessly communicate with mobile devices 125, which may be off-premises. As an example, the premise 102a may be train station, airport, port, bus station, stadium, home, business, or any other place of private or public meeting or congregation by multiple individuals. The mobile devices 125 may be located on the individual's person.

Mobile devices 125 may communicate with local office 103 including, for example, a peer-to-peer orchestrator 122. The mobile devices 125 may be cell phones, smartphones, tablets (e.g., with cellular transceivers), laptops (e.g., communicatively coupled to cellular transceivers), or any other mobile computing device. The mobile devices 125 may store assets and utilize assets. An asset may be a movie (e.g., a video on demand movie), television show or program, game, image, software (e.g., processor-executable instructions), music/songs, webpage, news story, text listing, article, book, magazine, sports event (e.g., a football game), images, files, or other content. As an example, mobile device 125 may be a tablet that may store and playback a movie. The mobile devices 125 may include Wi-Fi transceivers, cellular transceivers, satellite transceivers, and/or global positioning system (GPS) components.

As noted above, the local office 103 may include the peer-to-peer orchestrator 122. Although shown separately, the peer-to-peer orchestrator 122 may be a server combined with one or more of the push server 105, the content server 106, and the application server 107. The peer-to-peer orchestrator 122 may be a computing device responsible for enabling individuals to obtain complete copies of assets while traveling or commuting from one place to another. In one or more arrangements, the peer-to-peer orchestrator 122 may be centrally located in the local office 103. In one or more alternative arrangements, there may be multiple peer-to-peer orchestrators (generally referred to herein as peer-to-peer orchestrator 122) that each have the same functionality but are located at different access points 127, premises 102, and/or edge servers as an add-in. The peer-to-peer orchestrator 122 may receive requests for the same asset from multiple mobile devices 125 and group mobile devices 125 requesting the same asset into one or more groups that are currently or predicted to be co-located for a period of time (e.g., mobile devices 125 traveling along the same route at the same time). As an example, a stadium may have an event that is attended by 50,000 individuals. The peer-to-peer orchestrator 122 may predict e.g., based on a location of the individual (e.g., seat number, GPS location from personal mobile device, etc.) and the event's schedule that the individual will likely remain co-located with the 50,000 individuals attending the event or a subset thereof for the duration of the event. The peer-to-peer orchestrator 122 may divide the requested into multiple asset parts, if the asset has not already been divided into asset parts by a content creator or other entity.

The peer-to-peer orchestrator 122 may transmit, from itself or cause transmission from the content server 106 to the mobile devices 125, an initial asset part (e.g., a first asset part) of the requested asset so that the mobile devices 125 may begin playback of the asset as quickly as possible. Further, the peer-to-peer orchestrator 122 may repeatedly transmit, from itself or cause transmission from the content server 106, a different subsequent asset part of the requested asset to each mobile device 125. The peer-to-peer orchestrator 122 may at least transfer or cause transmission of each asset part of the requested asset such that the group of mobile devices has a complete copy of the asset between them. The peer-to-peer orchestrator 122 may send, to each mobile device 125 of the group, a map identifying which mobile devices in the group have which asset parts of the requested assets, digital rights management information, authentication credentials, and various instructions to be executed by the mobile devices. The instructions may include one or more instructions for the group to, in response to losing connection with the peer-to-peer orchestrator 122, form one or more ad hoc mesh networks and share asset parts with one another so that each mobile device in the group has a copy of each asset part transmitted to the group. As a result, if the group of mobile devices 125 loses communication with the an edge router or access point, the group of mobile device 125 may form one or more ad hoc mesh networks and retrieve their corresponding missing asset parts from the other mobile devices 125 in the group to obtain a copy of each asset part that has been transmitted to the group.

Upon establishing communication with a peer-to-peer orchestrator 122 via another access point or base station, mobile devices 125 in the group may send a status update as to which asset parts of the asset the mobile device 125 has obtained. In response, the peer-to-peer orchestrator 122 may form a new group and a new map and transmit such information to each mobile device 125 of the new group interested in the asset for use by the mobile devices in retrieving other asset parts of the asset via one or more ad hoc mesh networks. In some instances, the group of mobile devices 125 lost connectivity with a peer-to-peer orchestrator 122 before the peer-to-peer orchestrator 122 could provide a complete copy of the requested asset to the group. In such instances, if the group of mobile devices 125 re-establishes communication with another peer-to-peer orchestrator 122 associated with another access point, that peer-to-peer orchestrator may continue to provide asset parts of the requested asset to the group at least until the group has a complete copy of the requested asset.

The peer-to-peer orchestrator 122 may be responsible for instructing mobile devices 125 with stored or recorded assets to announce themselves and identify their assets so that the peer-to-peer orchestrator 122 may use those mobile devices 125 to coordinate the transmission of asset parts of the assets from multiple sources (e.g., content server 106, another mobile device 125, etc.). The peer-to-peer orchestrator 122 may instruct those mobile devices 125 to join an ad hoc mesh network and permit other mobile devices in the ad hoc mesh network to obtain asset parts from the mobile device 125. If a new request for an asset is received by the peer-to-peer orchestrator 122 from a particular mobile device, the peer-to-peer orchestrator 122 may determine whether one or more other mobile devices 125 is co-located with the particular mobile device and has at least one asset part of the asset. If so, the peer-to-peer orchestrator 122 may instruct the particular mobile device to retrieve those asset parts of the asset from the one or more other mobile devices 125 via an ad hoc mesh network.

The peer-to-peer orchestrator 122 may be responsible for providing redundancy of asset parts to help ensure that a group of mobile devices 125 traveling together continue to have a complete asset between them, even if one or more mobile devices 125 leave the group by e.g., travelling in a different direction from the group.

Figure 2:
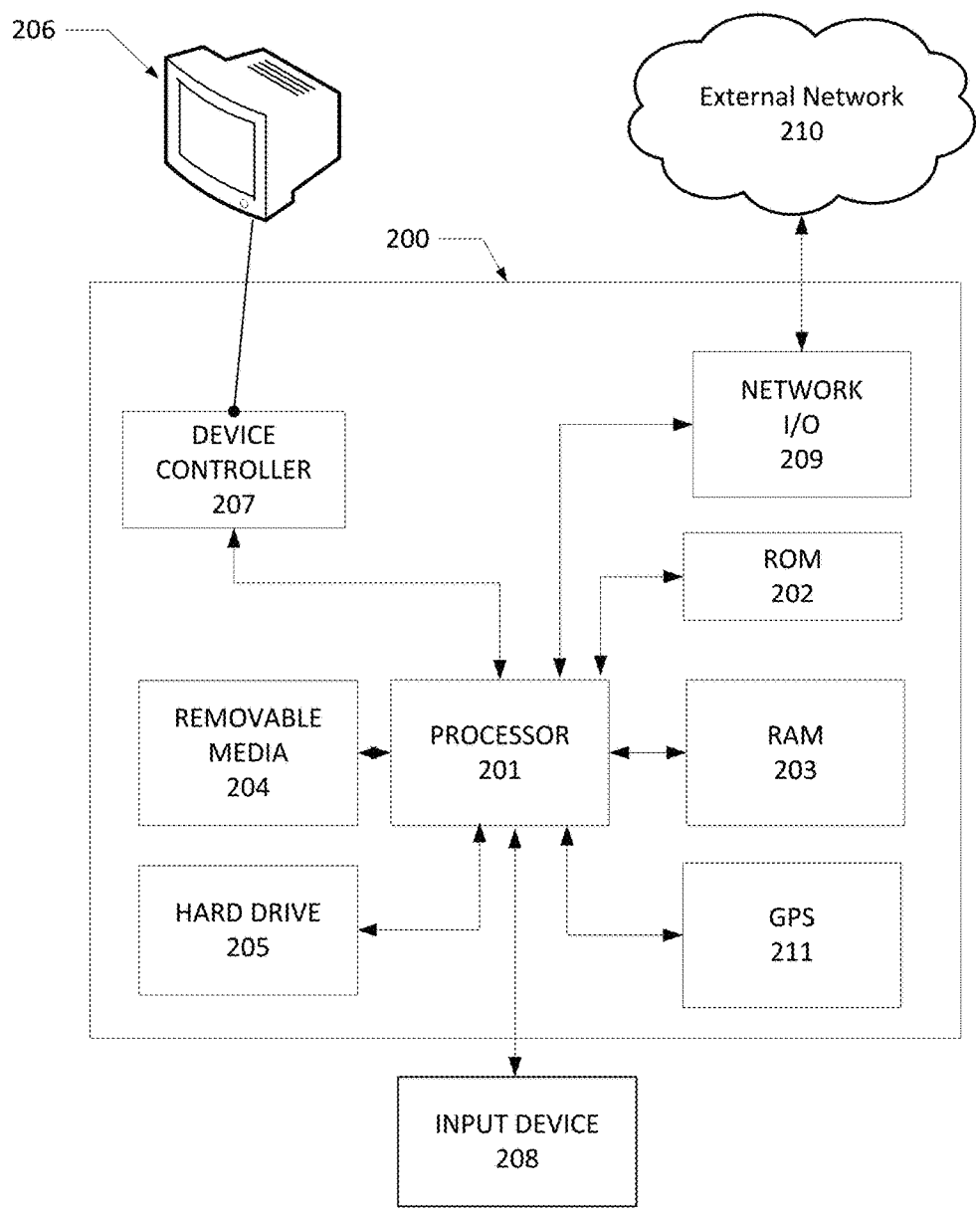
FIG. 2 depicts an illustrative computing device that may be used to implement any of the features and devices described herein.

FIG. 2 illustrates general hardware elements that can be used to implement any of the various computing devices discussed herein. The computing device 200 (e.g., peer-to-peer orchestrator 122, mobile device 125, etc.) may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. In some cases, multiple different asset parts of an asset may be transmitted to (or from) the computing device 200 concurrently using multiple different network interfaces. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., the processor 201, the ROM storage 202, the display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
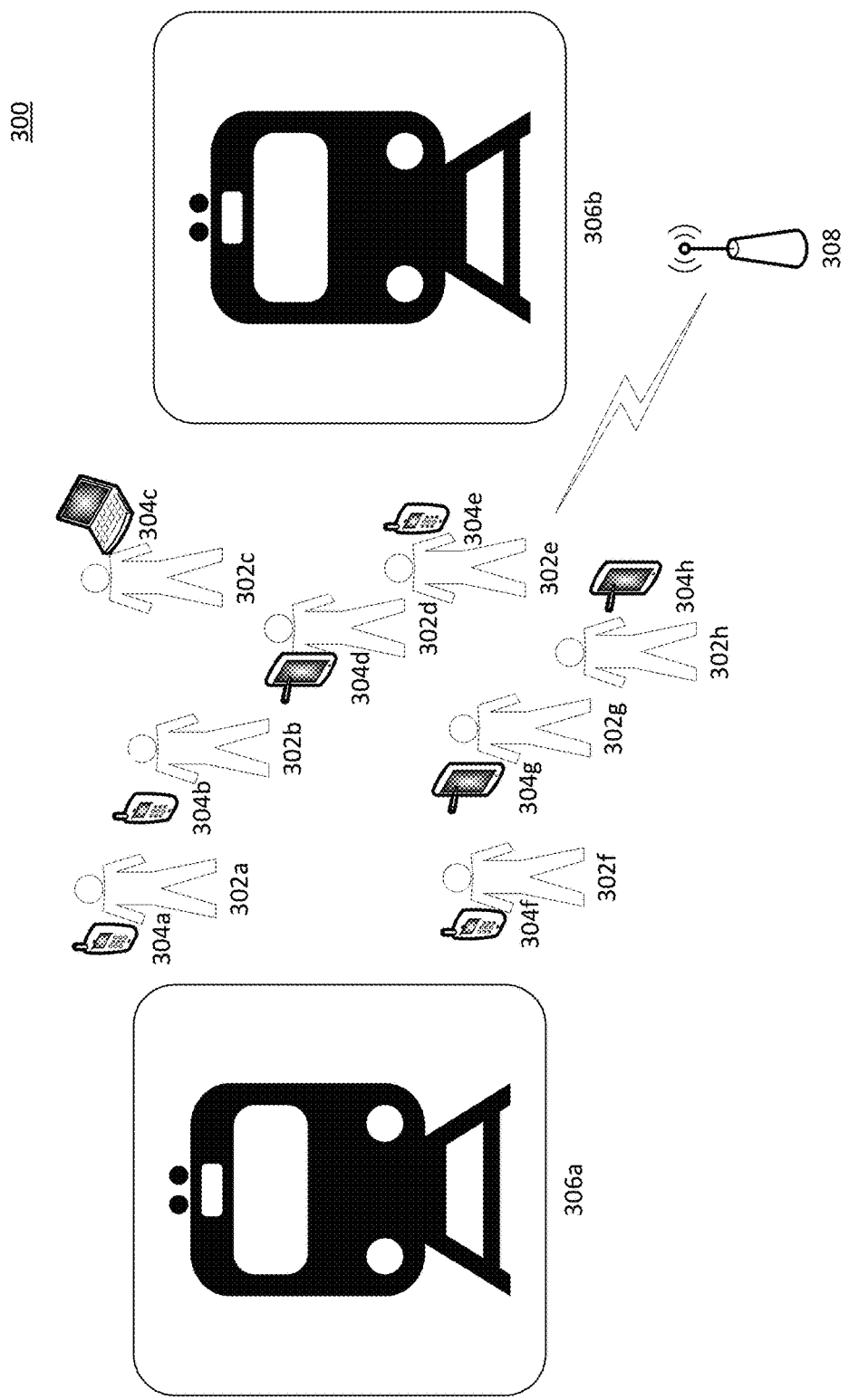
FIG. 3 depicts an illustrative scenario where multiple individuals are waiting to board trains at a train station, in accordance with one or more aspects described herein.

FIG. 3 depicts an illustrative scenario where multiple individuals are waiting to board trains at a train station, in accordance with one or more aspects described herein. As shown in FIG. 3, multiple individuals 302a-302h (generally 302) at a train station 300 may be waiting to board one of trains 306a and 306b (generally 306) that are heading in opposite directions from one another. As an example, the train 306a may be heading east and the train 306b may be heading west. The individuals 302 may be carrying mobile devices 304a-h (generally 304) on their person. The mobile devices 304 may be the mobile devices 125 and the train station 300 may be the premise 102a of FIG. 1 discussed above.

The train station 300 may, via an access point 308, provide wireless services (e.g., Wi-Fi) to its customers (e.g., individuals 302). Access point 308 may be the modem 110, the wireless device 116 (e.g., router, tablet, laptop, etc.), or the base station 127. Access point 308 may communicate with the local office 103 via the communication links 101. Each of the individuals 302 may request the same asset (e.g., a movie just recently released for rent on demand, a podcast, etc.) to download while they are waiting for their trains 306 to arrive. Each of the requests may be sent to a peer-to-peer orchestrator 122 located either at the local office 103 or at the access point 308, which may then determine one or more groups of individuals 302 who are likely to travel or collocate together (e.g., board the same train) and transmit different asset parts of the asset to different members of each group interested in the asset so that each group collectively has each (e.g., all) asset parts of the asset (e.g., a full copy of the asset), as will described in further detail below. In some cases, the asset parts may be distributed to different group members using an optimized distribution algorithm. For instance, the peer-to-peer orchestrator 122 may model the correlation of the groups by predicting the period of co-location of group members or groups, predicting a next access point, and predicting potential next groups to enable performance and cost based optimizations.

Once the individuals 302 board their respective trains 306, their mobile devices 304 may lose connectivity with the wireless services provided by access point 308 of the train station 300. In response to losing connectivity with the wireless services provided by access point 308 and, thus, connectivity with the peer-to-peer orchestrator 122, each of the groups of mobile devices 304 may form their own respective ad hoc mesh network to continue retrieving missing asset parts of the asset from the other mobile devices 304 in their group.

Figure 4:
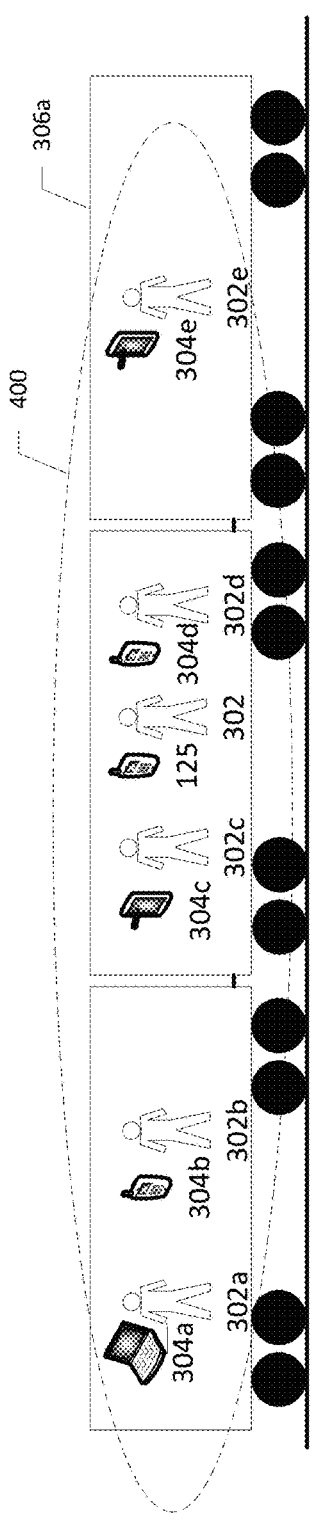
FIGS. 4 and 5 depict illustrative ad hoc mesh networks that may be used to implement any of the features described herein.

As an example, each of the individuals 302a-e may board train 306a and form the first group of individuals. The mobile devices 304a-e of the first group interested in the same asset may lose connectivity with the peer-to-peer orchestrator 122 as the train 306a leaves the train station 300 and, in response may form an ad hoc mesh network 400 as illustrated in FIG. 4. Because each of the mobile devices 304a-e of the first group are within wireless communication range with at least one other mobile device 304a-e of the first group, an ad hoc mesh network 400 may be generated. The mobile devices 304a-e of the first group may be able to communicate with one another over the ad hoc mesh network 400 formed from the mobile devices 304a-e of the first group to retrieve each asset part. Each of the mobile devices 304a-e of the first group may continually retrieve the different asset parts of the asset stored on different mobile devices 304a-e of the first group until each of the mobile devices 304a-e has each (e.g., all) asset parts of the asset.

In some instances, a mobile device (e.g., mobile device 304a) of the first group might not be able to directly communicate with another mobile device (e.g., mobile device 304e) of the first group. Prior to losing connectivity with the peer-to-peer orchestrator 122, the peer-to-peer orchestrator 122 may have provided, to each of the mobile devices 304a-e in the first group, a map identifying which mobile devices 304a-e in the first group have which asset parts of the asset. In addition, the peer-to-peer orchestrator 122 may instruct each of the mobile devices 304a-e of the first group to obtain the asset parts, as greedily as possible, from other mobile devices in the first group with which they are able to communicate and transmit map updates to one another as they obtain asset parts. Although the mobile device 304a might not be able to directly communicate with the mobile device 304e, the mobile device 304c may be able to directly communicate with the mobile device 304e and greedily obtain its missing asset parts from the mobile device 304e. The mobile device 304a may be able to directly communicate with the mobile device 304c and greedily obtain its missing assets parts from the mobile device 304c. As a result, the mobile device 304a may eventually obtain asset parts from the mobile device 304e. As the mobile devices 304a-e obtain a missing asset from one another, they may transmit map updates identifying the obtained asset parts.

Additionally, one or more mobile devices 125 outside of the mobile device 304a-e of the first group may serve as one or more intermediary mobile device 125 to proxy communication between mobile devices 304a-e of the first group interested in the asset. The intermediary mobile devices 125 might not be interested in the asset. For instance, the one or more intermediary mobile devices 125 may receive a user selection opting in to asset sharing in accordance with one or more user preference (e.g., capacity limits, bandwidth limits, battery limits, etc.). In such instances, the mobile device 304a of the first group may retrieve an asset from the mobile device 304e using intermediary mobile devices 125. Following the above example where the mobile device 304a might not be able to directly communicate with the mobile device 304e, asset parts may be transferred between the mobile device 304a and the mobile device 304e via one or more intermediary mobile devices 125. As an example, the mobile device 304a may instruct the one or more intermediary devices 125 to forward its communication to the mobile device 304e, and vice versa. In some cases, the one or more intermediary mobile devices 125 may prevent local access or playback of the asset. In some cases, the users of the one or more intermediary mobile devices 125 might not be notified of the routed communications and/or temporarily stored asset parts.

Figure 5:
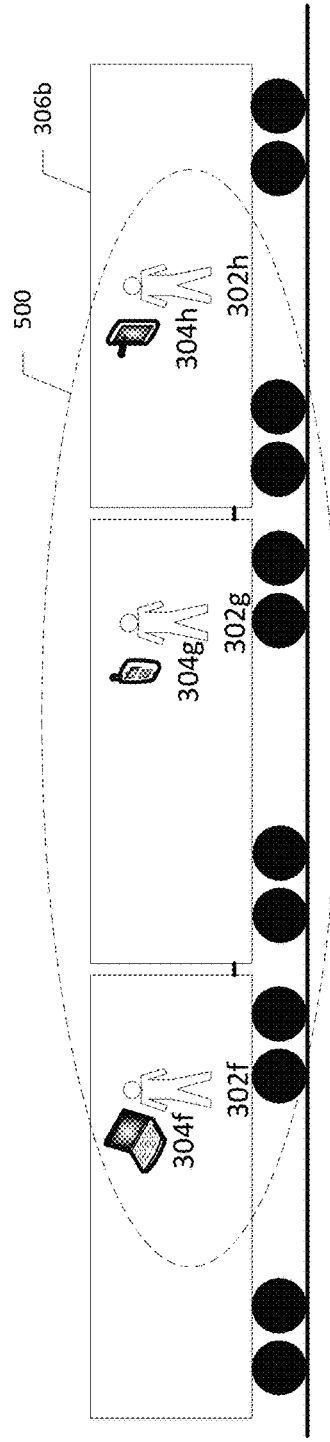

As another example, the individuals 302f-h may board train 306b and form the second group. The mobile devices 304f-g of the second group may lose connectivity with the peer-to-peer orchestrator 122 once the train 306b leaves the train station 300 and, in response may form an ad hoc network 500 as illustrated in FIG. 5. The mobile devices 304f-h of the second group may be able to communicate with one another over the ad hoc networks 500 formed from the mobile devices 304f-h of the second group to retrieve each asset part. Each mobile device 304f-h of the second group may continually retrieve the different asset parts of the asset stored on different mobile devices 304f-h of the second group until each mobile device 304f-h has each (e.g., all) asset parts of the asset.

Figure 6A:
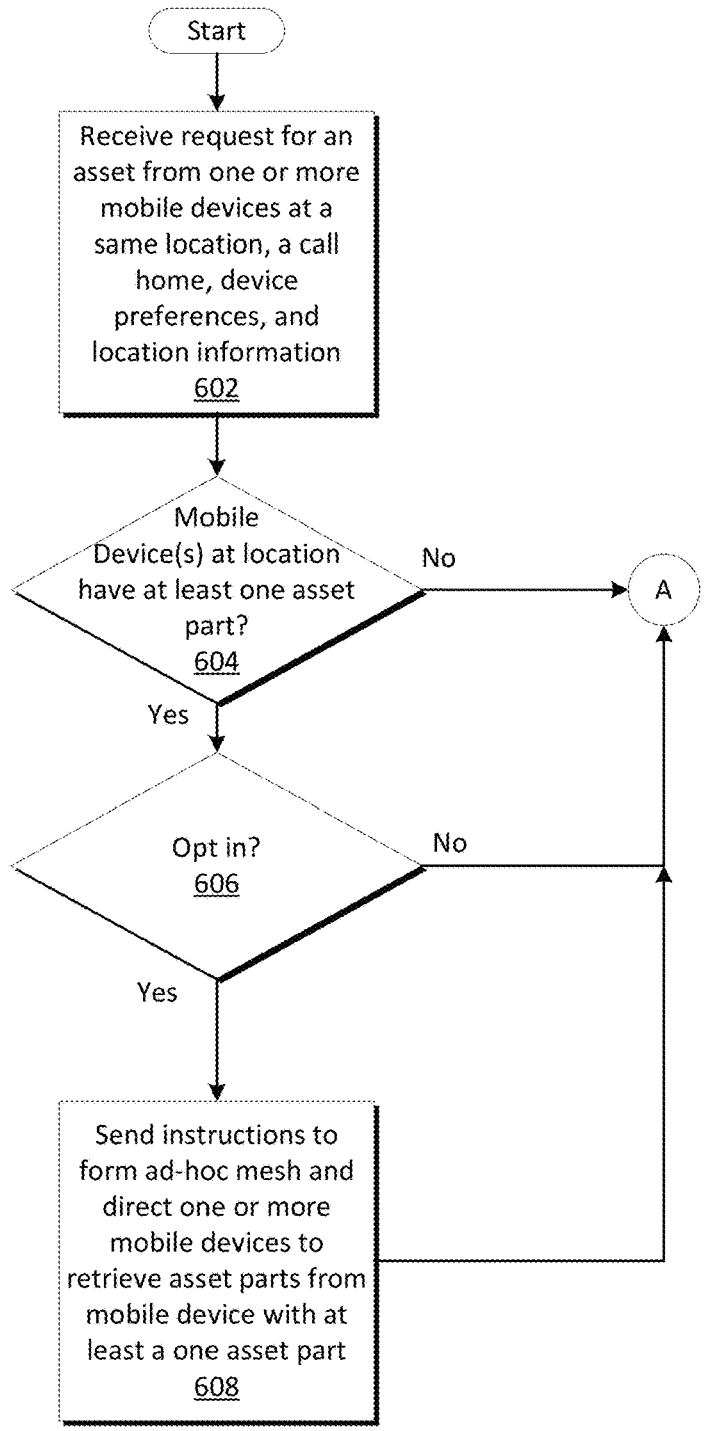
FIGS. 6A-6C depict an illustrative method for a peer-to-peer orchestrator to provide a breadth-first approach for peer-to-peer file sharing in a temporary ad hoc mesh network, in accordance with one or more aspects described herein.
Figure 6B:
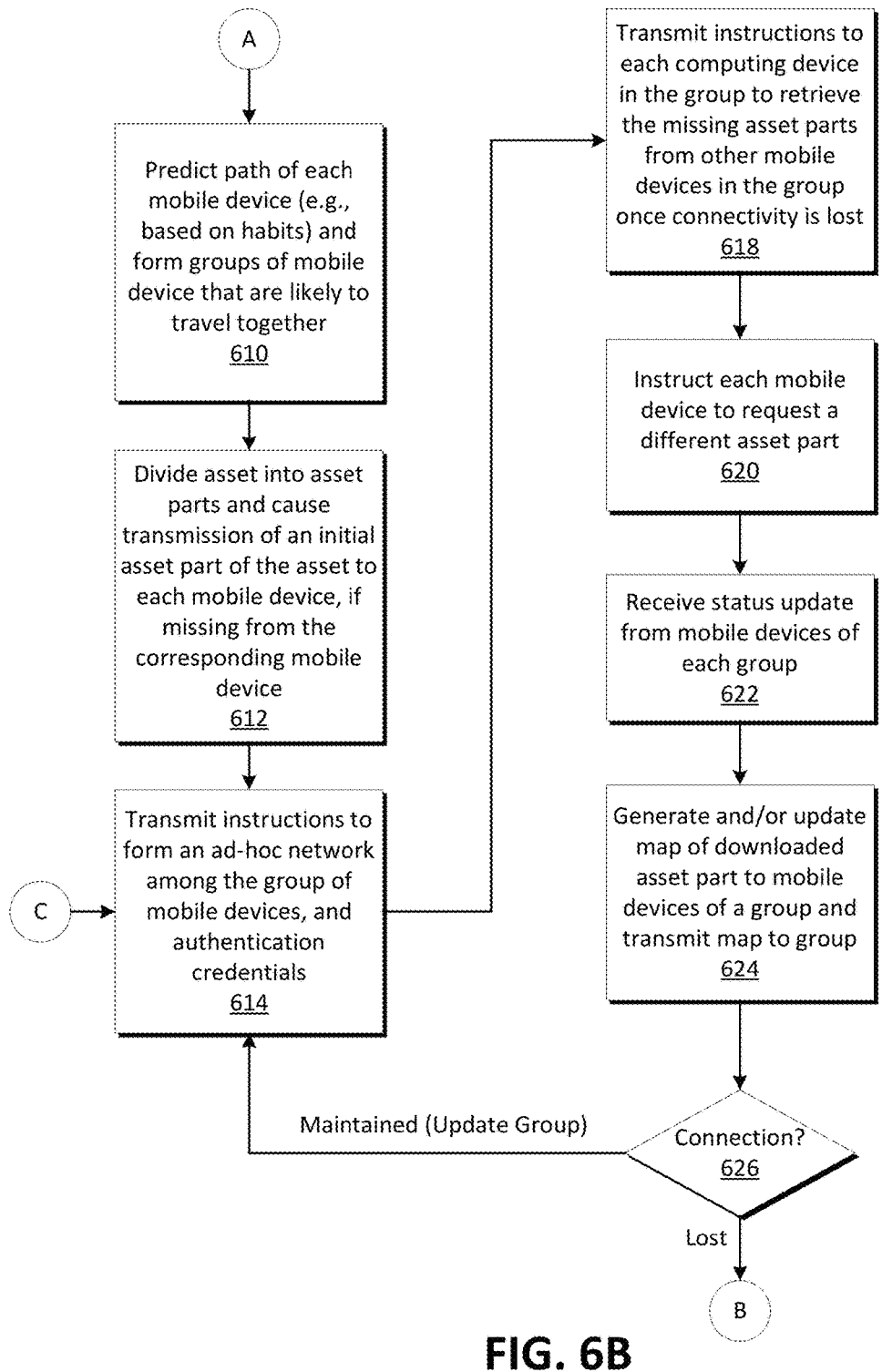
Figure 6C:
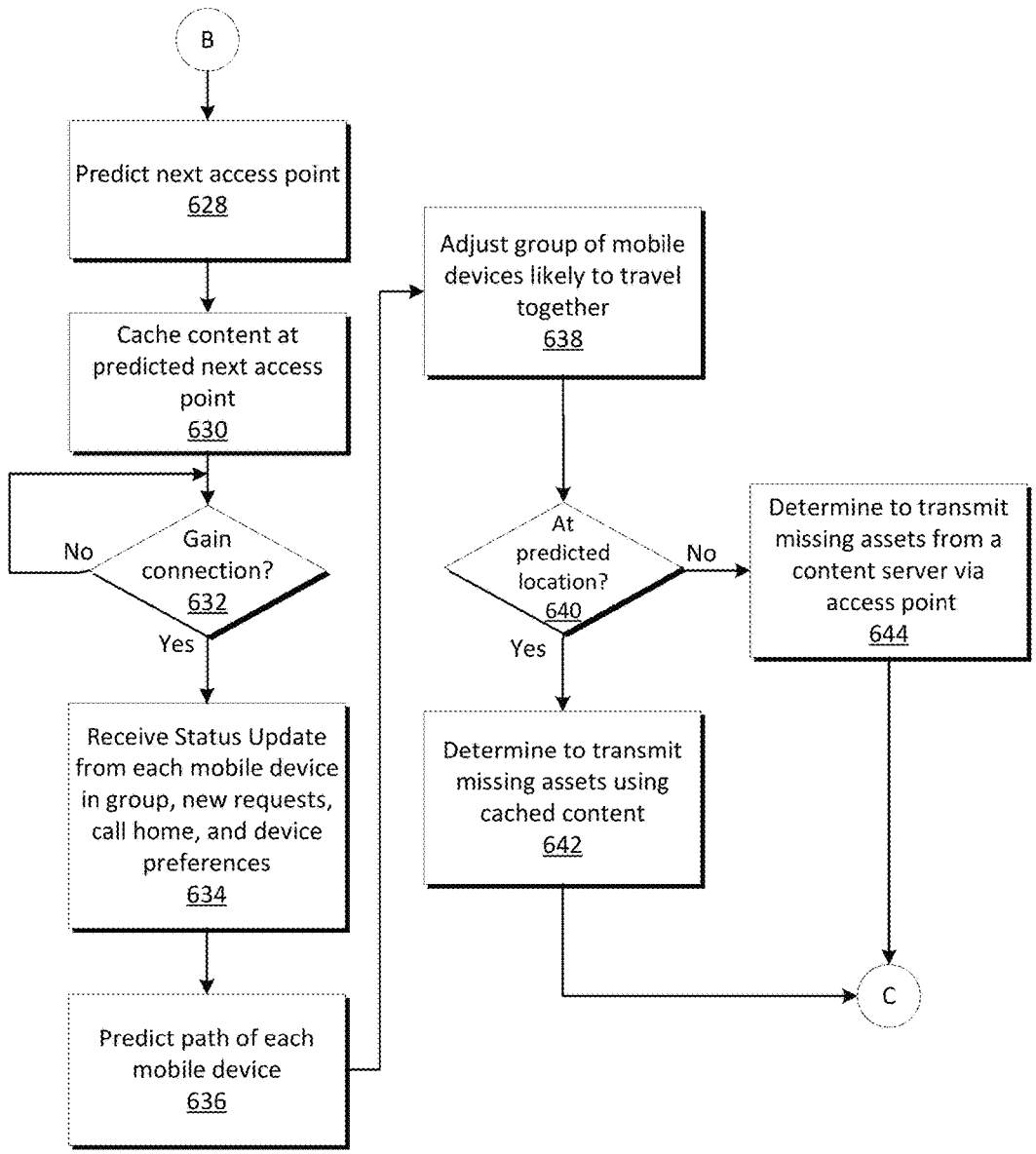

FIGS. 6A-6C depict an illustrative method for one or more peer-to-peer orchestrators to provide a breadth-first approach for peer-to-peer file sharing in a temporary ad hoc mesh network, in accordance with one or more aspects described herein. The method of FIGS. 6A-6C and/or one or more steps thereof may be performed by a computing device (e.g., peer-to-peer orchestrator 122). The method illustrated in FIGS. 6A-6C and/or one or more steps thereof may be partially or fully embodied, for example, in computer-executable instructions that are stored in a computer-readable medium, such as a non-transitory computer-readable memory. In some instances, one or more of the steps of FIGS. 6A-6C may be performed in a different order and/or combined. In some instances, one or more of the steps of FIGS. 6A-6C may be omitted and/or otherwise not performed.

At step 602, a computing device (e.g., peer-to-peer orchestrator 122) may receive requests for the same asset (e.g., a movie) from one or more requesting mobile devices 304 at the same location (e.g., train station 300 as discussed above in FIG. 3), call home messages, device preferences, and location information.

In some cases, mobile devices 304 may be considered co-located if they are located within a maximum distance threshold from one another. The request may include the location information (e.g., a set of longitude and latitude coordinates) of the mobile device 304. The peer-to-peer orchestrator 122 may compare the location information of the mobile devices 304 and determine whether they are each within the maximum distance threshold from one another. For each mobile device 304 that is within the maximum distance threshold from another mobile device 304, those mobile devices 304 may be identified as being at the same location and, thus, are likely able to use the same edge access point of the network (e.g., access point 308 in the train station example). Additionally or alternatively, the request may include an identifier of an access point within wireless communication range of the mobile device 304 and the peer-to-peer orchestrator 122 may identify those mobile devices 304 that are within the wireless communication range from the same access point as being co-located. In an example, the requesting mobile devices may be the mobile devices 304a-d, f-h. In the example, mobile device 304e may already have a copy of the asset and, thus, might not request it.

In one or more arrangements, a software application for managing the user preferences of the breadth-first approach for peer-to-peer file sharing in a temporary ad hoc mesh may be installed on the mobile devices 304. This software application may be referred to herein as a user preference application, which may be in the form of a mobile app. The user preference application may be responsible for enabling an individual 302 to select one or more user preferences to manage sharing of assets with other mobile devices 304 in an ad hoc mesh network, which will be described in further detail below. A user preference may include an opt-in option to permit sharing assets stored on the mobile device 304. If an individual 302 has not opted in to asset sharing, the mobile device 304 of the user 302 may prevent and/or otherwise block other mobile devices from obtaining assets from that mobile device 304. Another user preference may include an opt-out option if the mobile device's 304 battery falls below a minimum battery level threshold in order to conserver power of the mobile device 304. As an example, a mobile device 304 may permit sharing of its stored asset parts if its battery level is greater than or equal to a minimum battery level but may block sharing of its asset parts if its battery level is less than the minimum battery level. Yet another user preference may include bandwidth caps (e.g., maximum limits in bandwidth usage) in order to prevent the sharing of the stored assets from slowing down other downloads or web browsing being performed by the mobile device. Still yet another preference may include data usage cap (e.g., maximum limits in data usage) for cellular connections since such data usage is costly. Still yet another preference may include a storage usage cap (e.g., maximum limits in local storage usage) for asset parts. In some cases, the one or more intermediary mobile devices 125 not interested in the asset but relay asset parts may use the storage usage cap preference to limit use of the resources provided by their intermediary mobile device 125.

In some instances, the peer-to-peer orchestrator 122 may receive a call home message from one or more mobile devices 304 to inform the peer-to-peer orchestrator 122 of any assets (or asset parts) that the mobile devices 304 may have stored. Mobile devices 304 may send the call home message in response to an announcement request from the peer-to-peer orchestrator 122. Additionally or alternatively, in one or more arrangements, the peer-to-peer orchestrator 122 may transmit instructions to the mobile devices 304 instructing them to, periodically or in response to a new public Wi-Fi connection, announce to a peer-to-peer orchestrator 122 any assets (or asset parts) they may have stored on the mobile devices 304 via a call home message. In one example, an individual 302e may have recorded a movie (or received a recording of the movie from a STB or DVR) and stored the movie (or an asset part thereof) on the individual's 302e mobile device 304e. Upon connecting with the Wi-Fi access point 308 of the train station 300, the mobile device 304e may transmit the call home message announcing that the mobile device 304e has a copy of the movie.

In response to receiving the requests for the same asset from one or more mobile devices 304a-d, f-h at the same location (e.g., the train station 300), the peer-to-peer orchestrator 122 may, at step 604, determine whether one or more mobile devices 304 (e.g., the mobile device 304e), that are co-located with the requesting mobile devices 304 a-d, f-h, have at least one asset (or asset part) of the requested asset locally stored. In this example, the mobile device 304e may announce that it has a full copy of an asset. As a result, the mobile device 304e might not send a request for the asset since it already has a copy of the asset. In another example, mobile device 304a may announce that it has one or more asset parts of the asset but not the entire asset and, as a result, may be one of the mobile devices requesting the asset. If none of the mobile devices 304 have at least one asset part of the requested asset locally stored, the method may continue to step 610 discussed below.

Otherwise, if one or more of the mobile devices 304 store at least one asset part of the requested asset, the peer-to-peer orchestrator 122 may, at step 606, determine whether those mobile devices (e.g., the mobile device 304e) that have at least one asset part of the requested asset have opted in to asset sharing. For instance, the peer-to-peer orchestrator 122 may analyze the received preferences of the mobile device 304e (which has not requested the asset but has a locally stored copy of the asset) to determine whether the individuals 302e has opted in to sharing assets (or, alternatively, opted out of sharing assets). As an example, the mobile device 304e may have received user input from the individual 302e. The user input may be indicative of opting in to sharing assets. In some cases, the mobile device 304e may transmit the indication of the user's opt in to the peer-to-peer orchestrator 122. The peer-to-peer orchestrator 122 may then instruct the mobile device 304e to share the asset with specified mobile devices. In other cases, the mobile device 304e might not send the indication of the user's opt in to the peer-to-peer orchestrator 122. In such cases, the mobile device 304e may permit the asset to be retrieved by requesting mobile devices 304. If the mobile device 304e did not receive the user's opt in from the individual 302e, it may deny requests from the other mobile devices 304 to retrieve its asset.

At step 608, for those mobile devices having at least one asset part of the requested asset and who have opted in to asset sharing, the peer-to-peer orchestrator 122 may send instructions to each of the mobile device 304a-h to form an ad hoc mesh network with the mobile device 304e and direct the requesting mobile devices 304a-d, f-h to retrieve asset parts from those mobile devices that have opted in to asset sharing and have an asset part.

For instance, the peer-to-peer orchestrator 122 may send connection information (e.g., SSIDs, media access control (MAC) addresses) for use in establishing the ad hoc mesh network. The peer-to-peer orchestrator 122 may also send, to each of the requesting mobile devices 304a-d, f-h, a list of the asset parts (e.g., asset ID, asset part ID, etc.) stored by mobile device 304e. As a result, each of the requesting mobile devices 304a-d, f-h may retrieve the asset (or asset parts) from mobile device 304e over the ad hoc mesh network. In some instances, the listing may specify the order in which each asset parts are to be retrieved by a requesting mobile device 304a-d, f-h and this order may be different for each mobile device 304a-d, f-h. For example, the peer-to-peer orchestrator 122 may instruct the mobile device 304b to first retrieve asset part one and then asset part two, and may instruct the mobile device 304c to first retrieve asset part two and then asset part one. In some cases, the order in which assets are retrieved may be specified to favor specific asset parts to increase their overall distribution in the system and increase their aggregate availability. An asset part may be favored in order to promote certain popular material. Initial asset parts of the asset may be favored to enable quick playback of the asset. In some cases, specific asset parts may be moved to adjacent nodes (e.g., other mobile devices) in a travel network where there is demand expected at the adjacent node at a later point in time.

In some instances, the peer-to-peer orchestrator 122 may transmit, to the mobile device 304e (which has a complete copy of the asset), instructions to divide the asset into multiple asset parts and assign part identifiers to the asset parts, if the asset has not already been divided into asset parts by the content creator or during encoding of the asset. The division of the asset may be performed using an idempotent division operation so that each copy of the asset would have consistent asset parts, which may permit use of variable bitrates and accurate advertisement insertion.

In instances where multiple mobile devices 304 have the requested assets (or asset parts), the peer-to-peer orchestrator 122 may instruct the requesting mobile devices 304a-d, f-h to select the mobile device having the requested asset (or asset parts) with which it has the fastest connection speed or is closest to.

In instances where, in step 606, the peer-to-peer orchestrator 122 determined that the mobile device 304 (e.g., the mobile device 304e) having a local copy of the asset did not opt in to asset sharing, the method may continue to step 610.

Referring now to FIG. 6B, at step 610, the peer-to-peer orchestrator 122 may predict a path of each mobile device 304 and form groups of mobile devices 304 that are likely to travel together (e.g., travel along a same route (or portion thereof) at the same time for a period of time). As a result, the peer-to-peer orchestrator 122 may predict which of the mobile devices 304 will board train 306a and which of the mobile devices 304 will board train 306b to form the first and second groups discussed above. For the mobile devices 304 to form a group, only the immediate next section of their predicted route needs to be the same. That is, they may still be grouped together even if at a later time (e.g., at the next train station) they will have a different route from other mobile devices 304 in the group. The peer-to-peer orchestrator 122 may keep track of which mobile device 304 have been placed into which groups by storing an identifier of the mobile device 304 (e.g., a mac address) and its corresponding group ID.

Figure 7:
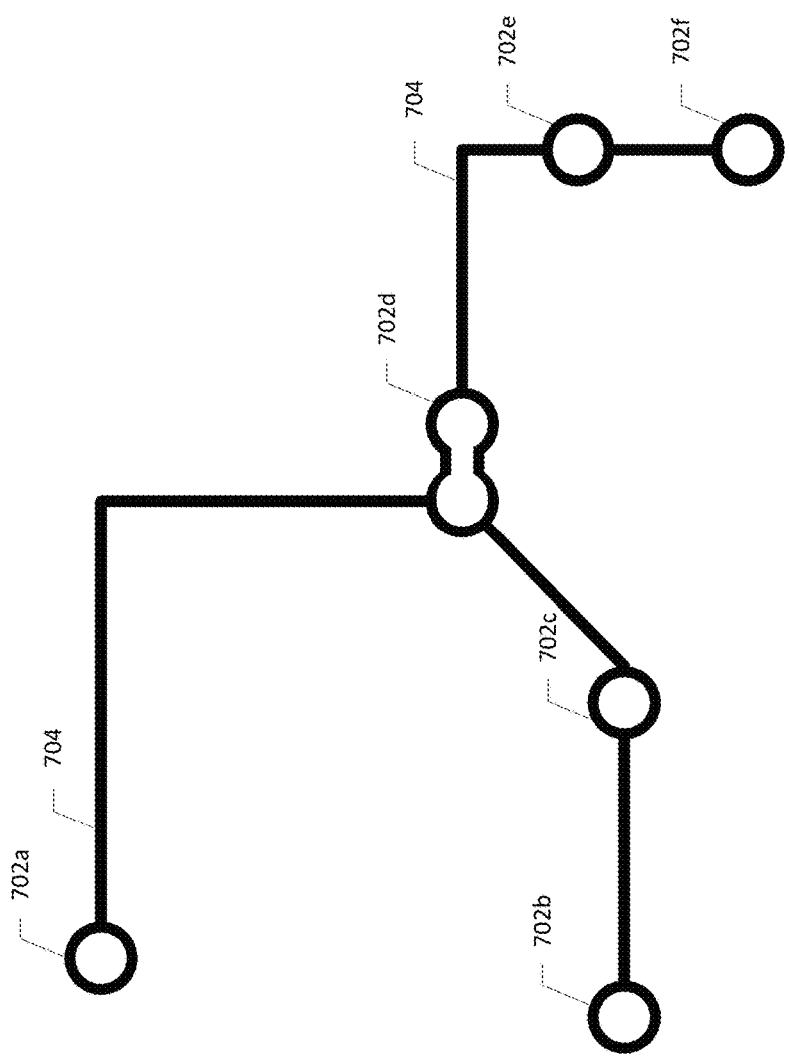
FIG. 7 depicts an illustrative train system, in accordance with one or more aspects described herein.

FIG. 7 depicts an illustrative train system, in accordance with one or more aspects described herein. As shown in FIG. 7, a map of a train system 700 that include multiple train stations 702a-702f (generally 702) interconnected by multiple train tracks 704. Train station 702d may be a transfer station to another line of the train system 700.

The peer-to-peer orchestrator 122 may learn traveling and/or commuting habits of individuals 302. To this end, the peer-to-peer orchestrator 122 may transmit instructions to mobile devices 304 to store its location information and a timestamp in a location log on a periodic basis and/or in response to a user-specified instruction to determine and store its location information and the timestamp. The location information may be in the form of GPS longitude and latitude coordinate pairs. The timestamp may include a field for year, month, day, day of the week, hour, minute, second, am or pm, time zone, etc. Periodically (e.g., at the end of each day), mobile devices 304 may transmit the location log to the peer-to-peer orchestrator 122, which may store the log in a database with each record in the database being specific to one individual 302. The peer-to-peer orchestrator 122 may associate a particular location with an object using a mapping of locations to objects. As an example, the GPS coordinates 123,124 may be the location of the individual's home and the GPS coordinates 456,489 may be the location of a train station, with the objects being the individual's home and the train station. Other objects include airports, roads, work, bus station, etc. The peer-to-peer orchestrator 122 may use pattern recognition algorithms to learn habitual traveling or commuting patterns of individuals 302 using the objects associated with the location information provided by the mobile devices 304 and timestamps of when the individual was at each location/object. Further, pattern recognition algorithm may account for public transit transportation schedules (e.g., train schedule, bus schedule, flight schedule, etc.). The learned habitual pattern may be determined by discovering regularities in the location of the individual on a particular day of the week at a particular time, which may be used for path prediction. As an example, the peer-to-peer orchestrator 122 may determine that a particular individual 302c regularly arrives at train station 702c each morning at 8:00 am, Monday through Friday, to take the 8:15 am train to station 702a by way of train station 702d. Over time, as more location and timing information is collected, the peer-to-peer orchestrator 122 may refine habitual traveling and commuting patterns of an individual.

In one or more additional or alternative embodiments for predicting the path of the mobile devices 304, the peer-to-peer orchestrator 122 may predict paths of the mobile devices 304 based on a join history of mobile devices 304. The peer-to-peer orchestrator 122 may instruct the mobile devices 304 to generate and update a join history log. The peer-to-peer orchestrator 122 may instruct the mobile devices 304 to broadcast beacon signals and receive beacon signals from other mobile devices 304 if the mobile devices 304 lose connectivity with a service area provided by an access point, which may occur, for example, when the train leaves a train station service area or a plane leaves an airport service area.

The beacons may be transmitted on a beacon radio frequency (RF) channel or sub-channel specified by the peer-to-peer orchestrator 122. A mobile device 304 may be instructed to begin continuously broadcasting beacon signals after the mobile device 304 loses connectivity with a service area (e.g., a train service area, airport service area, etc.) for at least a certain time period (e.g., 30 seconds, 1 minute, 5 minutes, etc.). By preventing the mobile device 304 from broadcasting beacon signals and/or recording received beacon signals prior to elapsing of this time period, the mobile device 304 might not prematurely perform such functions if the mobile device 304 is located on the fringe of a service area where signal reception may be spotty. After the time period has elapsed, the mobile device 304 may continuously broadcast its beacon signal. The time period may be specified by the peer-to-peer orchestrator 122.

The beacons may include one or more identifiers, which may be in the form of a media access control (MAC) address, an international mobile station equipment identity (IMEI), a Bluetooth low energy (BLE) token, customer identifier, user profile identifier, or a combination thereof. If connectivity to a service area (e.g., the train station service area) is lost for the preset time period, the mobile devices 304 may periodically (e.g., every 30 seconds, every 2 minutes, every 10 minutes, etc.) listen for beacon signals on the designated beacon channel and record, in the join history log, each of the identifiers associated with the mobile devices 304 from which it receives a beacon signal, the time at which a first-in-time beacon signal was received from a particular mobile device, the time at which a last-in-time beacon signal was received from the particular mobile device, geographic location of the mobile device 304 when it received each of the beacon signals, an indication of how fast the mobile device was traveling when it received each of the beacon signals, which RF IP interface of the mobile device was the beacon signal received on (e.g., Wi-Fi 802.11, cellular 4G LTE, etc).

The mobile devices 304 may also use the join history log to keep track of how many times in a row a beacon signal is received from the other mobile devices 304. As an example, the mobile devices 304a may record how many times in a row that the mobile device 304a received a broadcast signal from mobile device 304b. If the mobile device 304a discovers that it has received a beacon signal from mobile device 304b a preset minimum number of times (e.g., 5 times, 15 times, 30 times, etc.), an application installed on the mobile device 304a may determine that the mobile device 304b travels partially along the same route as the mobile device 304a and may tag and/or otherwise mark it as such in the join history log.

When the mobile devices 304 enter and establish a connection with a service area (e.g., another train station or airport), the mobile devices 304 may stop broadcasting beacon signals and stop listening for and/or recording received beacon signals (unless it leaves the service area again). If a connection has been established with the service area, the mobile devices 304 may upload, to the peer-to-peer orchestrator 122, the identifiers associated with the mobile devices 304 it tagged or marked in its join history log. In some instances, the mobile devices 304 may upload their join history log so that the peer-to-peer orchestrator 122 may determine which of the mobile devices 304 traveled together.

Over time, the peer-to-peer orchestrator 122 may identify a group of mobile devices 304 (e.g., the first group of mobile devices 304a-e discussed above, the second group of mobile devices 304f-h discussed above, etc.) traveling together from one service area to another service area based on n (e.g., one to three) degrees of separation. As part of the grouping, the peer-to-peer orchestrator 122 may assign a label (e.g., group ID) to all mobile devices 304 in a certain group.

In one or more additional or alternative embodiments, the peer-to-peer orchestrator 122 may predict a path of a mobile device 304 based on service area exit and entry history with a different mobile device 304. Each access point (e.g., access point 308) providing a service area may monitor and collect data about joint entries into the service area by two or more of the mobile devices 304 and joint exits from the service area by two or more of the mobile devices 304. Entry to a service area by a mobile device 304 may refer to a mobile device 304 establishing a wireless connection with an access point. Exit from a service by a mobile device 304 may refer to a mobile device 304 that has lost a wireless connection with the access point. Upon entry or exit of a mobile device 304 to an access point, the access point may inform its peer-to-peer orchestrator 122 of an identifier of the access point or service area, an identifier of the mobile device 304 and an indication that the mobile device 304 entered or exited the service area. If two or more mobile devices 304 exit a service area during a preset time period (e.g., within 10 seconds of one another), then these mobile devices 304 may be traveling together and the peer-to-peer orchestrator 122 may group the n mobile devices 304 into a candidate group. If the mobile devices 304 of the candidate group enter another service area during a subsequent time period (e.g., within 10 second of one another), then these mobile devices 304 may be identified as traveling together and can form a group because the mobile devices 304 are leaving one access point and entering another access points at substantially the same, which suggests that the mobile devices 304 have the same travel path and are co-located with one another for at least a period of time.

In one or more additional or alternative embodiments, the peer-to-peer orchestrator 122 may predict a path based on service area exit and entry history of a mobile device 304. The peer-to-peer orchestrator 122 may record when and in what order a series of service areas were entered and/or exited by a mobile device 304, which over time, may reveal a pattern of travel (e.g., travelling to work in the morning). Using the patterns, the peer-to-peer orchestrator 122 may determine which mobile device 304 may be traveling together and place them into the same group.

In one or more additional or alternative embodiments, the peer-to-peer orchestrator 122 may identify the mobile devices 304 that occupy a space (e.g., a service area) for a concurrent period of time. As an example, if the concurrent period of time is one minute, the two mobile devices 304 may form a group when the two mobile devices 304 occupy the same area from at least one minute. As other mobile devices 304 also occupy the area for same area as the group for at least one minute, those mobile devices 304 may be added to the group. If a mobile device 304 leaves the area while the other members of the group remain in the area, the mobile device 304 may be removed from the group.

Returning to FIG. 6B, at step 612, the peer-to-peer orchestrator 122 may itself or instruct the content server 106 to divide the requested asset (e.g., movie) into different asset parts and cause transmission of an initial asset part to each mobile device 304 of the group (if the initial asset part is missing from the mobile device 304). For instance, the peer-to-peer orchestrator 122 may instruct each mobile device 304 in the group to request the initial asset part from a specified content location.

If the asset has already been divided into asset parts by a content creator or a transcoding/encoding system, the peer-to-peer orchestrator 122 may receive metadata from the content creator or the transcoding system specifying the asset parts. As a result, the peer-to-peer orchestrator 122 might not itself divide the asset into asset parts and instead use the asset parts specified by the content creator or the transcoding system. In addition, the peer-to-peer orchestrator 122 may map the asset parts specified by the metadata to the requesting mobile devices 304a-d, f-h.

Based on the type of asset, the peer-to-peer orchestrator 122 may determine whether to send each of the requesting mobile devices 304a-d, f-h an initial asset part to each of the requesting mobile devices 304a-d, f-h. In some instances, the asset may be a movie, show, song, or other media content type that has an output that changes with time. In such instances, an initial (e.g., first-in-time) asset part may be transmitted to each of the requesting mobile devices 304a-d, f-h so that they may quickly begin playback of the asset beginning with the initial asset part. For example, in the first group of mobile devices 304a-e, the mobile devices a-d may each receive the initial asset part (e.g., asset part ID 1). Mobile device 304e might not receive the initial asset part if it already has it stored in its memory. In other instances, the asset may be a document, file, or picture that does not vary with time (absent user modification). In such instances, the peer-to-peer orchestrator 122 might not transmit the initial asset part to each (e.g., all) of the requesting mobile devices 304a-d, f-h. Rather, the peer-to-peer orchestrator 122 may send the initial asset part to one or more of the requesting mobile devices 304a-d, f-h.

As used herein, if an asset part is transferred from one device to another, the message may include an envelope portion and a payload portion. The envelope portion may include an asset ID, an asset part ID, encode information, encryption information, length, key ID (e.g., digital rights management (DRM), decryption hint or ID), lifetime (e.g., valid from, valid to, etc.), cryptographic signature, etc. The payload portion may include the actual content of the asset part. The mobile devices 304 may receive asset parts using multiple different RF IP interface of the mobile device 304 (e.g., Wi-Fi 802.11, cellular 4G LTE, etc).

At step 614, the peer-to-peer orchestrator 122 may transmit instructions, to each group, to form one or more ad hoc mesh networks among the group of mobile devices 304, and may also transmit authentication credentials. In an internet protocol version 6 (IPv6) implementation, the peer-to-peer orchestrator 122 may use multiple subnets to provide communication channels in service areas for use by the mobile devices 304. For example, the peer-to-peer orchestrator 122 may transmit a map that assigns asset parts and/or group identifiers to different subnets.

The group of mobile devices 304 may form one or more ad hoc mesh networks if the group of mobile devices 304 loses connection with the access point 308. For instance, the mobile device 304 may transmit information to enable the mobile devices 304 in a group to form an ad hoc mesh network with one another including, for example, SSIDs, MAC addresses, IMEIs, and/or BLE tokens of each mobile device 304 in the group, etc. In some cases, the peer-to-peer orchestrator 122 may provide hints to the group of mobile devices 304 to aid the mobile devices 304 in determining whether to form an ad hoc mesh network. The hints may include latency/availability information about the access point and potential ad hoc groups. In some cases, the group of mobile devices 304 may also be informed of geo-fence corresponding to the edges of the service area so that the ad hoc mesh network is formed when the group of mobile devices 304 is located at the edge of the service area.

The peer-to-peer orchestrator 122 may transmit authentication credentials, which may enable each of the mobile devices 304 to verify each other's identity when attempting to form an ad hoc mesh network. A mobile device 304 may prevent an ad hoc connection with a mobile device that is not authenticated, and permit an ad hoc connection with a mobile device that is authentic.

At step 618, for each group, the peer-to-peer orchestrator 122 may transmit instructions, to the each of the mobile devices 304 in a group, to retrieve missing asset parts from other mobile devices in the group if connectivity with the access point is lost. In some instances, the instructions may specify an order in which a particular mobile device 304 should retrieve the asset parts from the other mobile devices 304 in the group. As an example, the order may be to retrieve asset parts in chronological order so that the asset may be played by the mobile device 304 as quickly as possible. In some instances, the order may be different for each mobile device 304 in the group. In some cases, each mobile device 304 may receive a map generated in step 624 that lists which mobile devices 304 have which assets, which may be used to retrieve asset parts from other mobile devices in the group.

At step 620, for each group, the peer-to-peer orchestrator 122 may instruct each mobile device 304 in the group to request a different asset part from a content location. In one illustrative example, an asset may have ten asset parts respectively assigned asset part ID 1-10. In step 612, the peer-to-peer orchestrator 122 may have transmitted an instruction to each mobile device 304a-e of the first group to retrieve the initial asset part assigned to asset part ID 1 so that the mobile devices 304a-e may quickly begin playback of the asset. The instruction may include the asset part ID, digital rights management credentials, and a location of the asset part (e.g., a content server location and/or local mobile device) from which to retrieve the asset part. In order to maximize throughput and reduce the amount of time needed by the first group of devices 304a-e to download other asset parts, the peer-to-peer orchestrator 122 may transmit instructions to different mobile devices 304a-e of the first group to retrieve a different one of the asset parts from a content location (e.g., a content server location, another mobile device, etc.). For example, the peer-to-peer orchestrator 122 may transmit an instruction to the mobile device 304a to retrieve the second asset part assigned to asset part ID 2, an instruction to the mobile device 304b to retrieve the third asset part assigned to asset part ID 3, and so on.

In response to receiving an instruction to retrieve an asset part, the mobile device 304 may transmit a request for the asset part to the device/location specified in the instruction (e.g., the content server 106, the local mobile device 304, etc.). The request may include the asset part ID and digital rights management information. The device location specified in the instruction (e.g., the content server 106, the local mobile device 304, etc.) may validate the request using the digital rights management information and, if valid, may transmit the asset part associated with the requested asset part ID to the requesting mobile device 304.

As discussed above, the mobile device 304e might not receive any asset parts if it already has it stored in memory. However, in some cases, the peer-to-peer orchestrator 122 may transmit instructions to the mobile device 304e to retrieve an asset part in order to refresh and/or upgrade the quality of the asset part with a new bitrate.

In determining which asset parts to have the first group of mobile devices 304a-e initially retrieve from an asset's location (e.g., the content server 106, the local mobile device 304, etc.), the peer-to-peer orchestrator 122 may prioritize asset parts that are to be played back earlier during playback of the asset than asset parts that are to be played back later during playback of the asset.

At step 622, for each group, the peer-to-peer orchestrator 122 may receive status updates from the mobile devices 304 of each group that have maintained communication with the access point 308. As an example, the peer-to-peer orchestrator 122 may receive, from the first group of mobile devices 304a-e, status updates of asset parts the mobile device 304a-e have successfully obtained. The status update may include an identifier of the mobile device 304, asset ID, a list of asset part IDs successfully obtained, download or connection speed, available memory of the mobile device 304, etc.

At step 624, the peer-to-peer orchestrator 122 may generate a map (or update the map if it has already been generated) for each group to indicate which mobile devices 304 of the corresponding group have which asset parts of the requested asset. As an example, the map may indicate that the mobile device 304a has a copy of the first and second asset parts. In one instance, the map may be in the form of a table having rows and columns with each row corresponding to a different mobile device 304 in the group and listing the asset IDs downloaded by that mobile device 304 in the columns of the table. In another instance, the map may be in the form of an array. The peer-to-peer orchestrator 122 may transmit the map of to each mobile device 304 of the group.

At step 626, for each group, the peer-to-peer orchestrator 122 may determine whether one or more of the mobile devices 304 have maintained or lost their wireless connection to the access point 308. For instance, a mobile device 304 may lose connection with the access point 308 by exiting the service area provided by the access point 308. As an example, the mobile devices 304a-e may be onboard the train 306a, which may have left the train station 300. Similarly, the mobile devices 304f-h may be onboard the train 306b, which may have also left the train station 300.

In one or more arrangements, the peer-to-peer orchestrator 122 may determine whether a group of mobile devices 304 as a whole has maintained its connection based on a threshold percentage of mobile devices 304 of the group that have maintained their connection with the access point 308. As an example, the minimum threshold percentage of mobile devices 304 of the group that have maintained their connection with the access point 308 may be 90%. That is, if at least 90% of the first group of mobile device 304*a-e* have maintained a communicative connection with the access point 308, then the peer-to-peer orchestrator 122 may determine that the first group of mobile devices 304*a-e* as a whole has maintained its communicative connection with access point 308 and has not left the service area (e.g., the train station) provided by the access point 308. Otherwise, if less than 90% of the mobile devices 304 of the first group did not maintain a communication connection with the access point 308, the peer-to-peer orchestrator 122 may determine that the group as a whole has lost its connection with the access point 308. In such instances, the peer-to-peer orchestrator 122 may update the group to remove mobile devices 304 have maintained a communication connection with the access point 308 since they are not traveling with the remaining mobile devices 304 in the group. Further, the peer-to-peer orchestrator 122 may update the map to remove the mobile devices 304 that have been removed from the group. Additionally, the peer-to-peer orchestrator 122 may identify asset parts that have been transmitted to mobile devices 304 that have been removed from its group. The peer-to-peer orchestrator 122 may then prioritize transmitting these identified asset parts to the other mobile devices 304 remaining in the group once communication with group is re-established at another access point (e.g., at another train station) by sending this information to another peer-to-peer orchestrator 122 associated with the next predicted access point the group of mobile devices 304 should encounter based on their predicted travel path, which will be discussed in greater detail below in steps 628 and 630.

In one or more additional or alternative arrangements, rather than using a minimum threshold percentage of mobile devices 304 that have maintained their connection with the access point 308, the peer-to-peer orchestrator 122 may determine whether a group as a whole has maintained or lost a communicative connection with the access point 308 based on a threshold percentage of mobile devices 304 of the group that have lost their connection with the access point 308.

Additionally, in cases where the peer-to-peer orchestrator 122 has determined that the group of mobile devices 304, as a whole or in part, has maintained its communication connection with the access point 308, the peer-to-peer orchestrator 122 may repeat steps 614-626 until either a connection is lost and/or each mobile device 304 in a group has received the each (e.g., all) of the asset parts of the requested asset. As an example, the peer-to-peer orchestrator 122 may determine that the first group of mobile devices 304*a-e* has not lost their connection with the access point 308 and, as a result, still are communicatively connected to the peer-to-peer orchestrator 122. In such cases, the peer-to-peer orchestrator 122 may repeat steps 614-626 until either a connection is lost and/or each mobile device 304 in a group has received each (e.g., all) of the asset parts of the requested asset. For example, at step 620, the peer-to-peer orchestrator 122 may use the map to determine which asset parts to transmit to which mobile devices 304*a-e* of the first group. Further, the peer-to-peer orchestrator 122 may dynamically update which mobile devices 304 are part of a particular group based on which mobile devices can connect with one another for a period of time.

The peer-to-peer orchestrator 122 may provide the entire set of asset parts to a group of mobile devices 304 as quickly as possible. As a result, in some instances, the peer-to-peer orchestrator 122 may only select asset parts that have not been transmitted to (or downloaded by) any of the mobile devices 304 in a group. The peer-to-peer orchestrator 122 may determine that the seventh through the tenth asset parts assigned to asset part IDs 7-10 have not yet been transmitted to the mobile devices 304*a-e* of the first group and, as a result, select these asset parts to transmit to the mobile devices 304*a-e* of the first group. In order to maximize throughput and reduce the amount of time needed by the first group of devices 304*a-e* to download the seventh through the tenth asset parts, the peer-to-peer orchestrator 122 may instruct different mobile devices 304*a-e* of the first group to request a different one of the seventh through the tenth asset parts from a content location (e.g., a content server location, another mobile device 304, etc.). For instance, the peer-to-peer orchestrator 122 may instruct the mobile device 304*a* to retrieve the seventh asset part, instruct the mobile device 304*b* to retrieve the eighth asset part, instruct the mobile device 304*c* to retrieve the ninth asset part and instruct the mobile device 304*d* to retrieve the tenth asset part. At steps 622-626, the peer-to-peer orchestrator 122 may receive status updates, update the map based on the status updates, transmit the update map to the first group of mobile devices 304*a-e*, and again determine whether the first group of mobile devices 304*a-e* has lost or maintained its connection with the access point 308.

If a complete asset (e.g., each of the asset parts of the requested asset) is provided to the group of mobile devices 304, the peer-to-peer orchestrator 122 may now provide redundancy by transmitting asset parts that have been transmitted to a particular mobile device 304 in the group to a different mobile device 304 in the same group. As a result, if the particular mobile device 304 does not travel with the group, the different mobile device 304 travelling with the group may share that asset part. As long as connection with the group of mobile devices 304 is maintained, the peer-to-peer orchestrator 122 may continue to transmit redundant asset parts (e.g., asset parts already transmitted to a mobile device 304 in the group) to other mobile devices 304 in the group.

If the peer-to-peer orchestrator 122 has determined, in step 626, that the group of mobile devices as a whole has lost its communication connection with the access point 308, the peer-to-peer orchestrator 122 may proceed to step 628.

Referring now to FIG. 6C, at step 628, if the peer-to-peer orchestrator 122 has lost its communication connection with the group of mobile devices 304, the peer-to-peer orchestrator 122 may predict, using a prediction scoring model, the next access point with which the group of mobile devices 304 may establish a communication connection once they enter a service area provided by that access point. This next access point may also be referred to herein as the predicted next access point. The peer-to-peer orchestrator 122 may predict the next access point based on the predicted route of the group of mobile devices 304, which may be based on travel patterns of one or more mobile devices 304 of the group. As an example, the peer-to-peer orchestrator 122 may predict multiple possible next access points based on the pattern of each different mobile device 304 of the group. If more than a preset percentage of possible next access points specify the same access point, then the peer-to-peer orchestrator 122 may determine that a particular access point should be the predicted next access point for the group of mobile devices 304. In some cases, the peer-to-peer orchestrator 122 may select multiple access points as likely to be the next access point for the group of mobile devices 304 if each of the selected access points scores above a preset threshold. In some cases, feedback may be provided by the next access point that connects with the group of mobile devices 304 to update route prediction and provide more accurate scoring models.

Additionally, the peer-to-peer orchestrator 122 may account for a travel system map in predicting the next access point. As an example, the peer-to-peer orchestrator 122 may determine that the access point 308 is associated with the train station 300 and that the train station 300 is located at the train station 702d in the train system 700 shown in FIG. 7. Using a map of the train system 700, the peer-to-peer orchestrator 122 may determine that a train (e.g., the train 306a) that picked up the first group of mobile device 304a-e at the train station 702d may only travel to one three train stations (e.g., train stations 702a, c, e) as the next possible train station. As a result, the peer-to-peer orchestrator 122 may remove access points associated with the train stations 702b, f from consideration as the predicted next access point.

In some instances, the peer-to-peer orchestrator 122 may account for a transportation schedule (e.g., a train schedule) in predicting the next access point. For instance, the peer-to-peer orchestrator 122 may identify a time at which connection was with the first group of mobile devices 304a-e is lost and identify the train 306a as the train transporting the first group if it left the train station 702d within a preset time period prior to losing the connection. As an example, if the preset time period is 15 seconds and a train (e.g., the train 306a) left within 15 seconds prior to losing connection with the first group, the peer-to-peer orchestrator 122 may identify that train as the train 306a transporting the first group. The peer-to-peer orchestrator 122 may then look up the next train station 702 at which the train 306a is scheduled to arrive (e.g., train station 702a) and select this train station as the predicted next access point. While the map and schedule have been described with respect to the train system 700, the map and schedule of an airline, ferry system, etc. may be used.

Additionally, the peer-to-peer orchestrator 122 may account for itineraries of the individuals 302a-e in the first group. For instance, at a previous time when the peer-to-peer orchestrator 122 had a communicative connection with the first group of mobile devices 304a-e, the peer-to-peer orchestrator 122 may have requested the itineraries of individuals 302a-e from the mobile devices 304a-e, which it may then use to determine predict the next access point for the first group.

At step 630, the peer-to-peer orchestrator 122 may cache asset parts missing (e.g., not yet transmitted to) a group of mobile devices 304 at the predicted next access point, which, in some cases, may be associated with a different peer-to-peer orchestrator. For instance, the peer-to-peer orchestrator 122 may cache missing asset parts of the first group of mobile devices 304a-e at or near the predicted next access point prior to the first group of mobile devices 304a-e entering a service area provided by the predicted next access point so that the missing asset parts may more quickly be transmitted to the first group of mobile devices 304a-e than if the missing asset parts were transmitted from the content server 106. In some cases, an access point may include a memory component for local storage of assets and asset parts. In some cases, the access point may be in communication with one or more edge servers that are geographically near (e.g., within a particular distance of) the access point. The peer-to-peer orchestrator 122 may store the geographic locations of access points, whether the access points have the ability store assets and/or asset parts, and/or the location of the edge server that is geographically closest to the access points. The access points and the edge servers may periodically inform the peer-to-peer orchestrator 122 (or the different peer-to-peer orchestrator) of their available and unused storage capacity. If the predicted next access point has available unused storage capacity that is sufficient to store one or more assets parts of the requested asset that have not yet been transmitted to the first group of mobile devices 304a-e, the peer-to-peer orchestrator 122 may instruct the different peer-to-peer orchestrator associated with the predicted next access point to retrieve asset parts from a content location. The peer-to-peer orchestrator 122 may also instruct the different peer-to-peer orchestrator 122 associated with the predicted next access point to transmit the asset parts to the first group of mobile devices 304a-e once they enter the service area provided by the predicted next access point.

If the predicted next access point either does not have a memory component, does not have available or unused storage capacity, or has insufficient storage capacity to store each of the missing asset parts, the peer-to-peer orchestrator 122 may instruct one or more of the edge servers near the predicted next access point to retrieve the missing asset parts that cannot be stored locally by the predicted next access point. In one instance, the missing asset parts may be transmitted to the geographically closest edge server of the predicted next access point so that they may be quickly transmitted to the first group of mobile devices 304a-e once they enter the service area provided by the predicted next access point.

At step 632, a peer-to-peer orchestrator 122 associated with an access point (e.g., the predicted next access point) may determine whether it has gained connection to a group of mobile devices 304 (e.g., the first group of mobile devices 304a-e). Each peer-to-peer orchestrator 122 associated with a particular access point may be configured to continuously monitor connections with the mobile devices 304 to determine if it has connected with a group of mobile devices 304. A mobile device 304 previously assigned to a group may have also been previously instructed by the peer-to-peer orchestrator 122 to, once it enters a service area of an access point, notify that access point's 308 corresponding peer-to-peer orchestrator 122 that the mobile device 304 is a member of a group. The notification may include group membership information, an identifier (e.g., MAC address) of the mobile device 304, and an identifier of the access point with which it has established a connection. As a result, when the first group of mobile devices 304a-e enters the service area of the next access point, each of the mobile devices 304a-e may notify the peer-to-peer orchestrator 122 that they have connected with the access point. If at least a minimum percentage of the mobile devices 304a-e of the first group has notified of their connection, the peer-to-peer orchestrator 122 may determine that the first group has gained a connection with the peer-to-peer orchestrator associated with the next access point and may proceed to step 634. Otherwise, if less than the minimum percentage of the mobile devices 304a-e of their connection, the peer-to-peer orchestrator 122 may determine that the first group has not gained a connection with the peer-to-peer orchestrator associated with the next access point and may continue to monitor connections/notifications of mobile devices 304 to determine whether it has gained connection to a group of mobile devices 304.

At step 634, the peer-to-peer orchestrator associated with the next access point may receive status updates from each of the mobile devices 304 in the group (e.g., mobile devices 304*a-e* of the first group) in a similar manner as discussed above in step 622, new requests for the requested asset and device preferences from mobile devices 304 co-located with the first group of mobile devices 304*a-e*, and call home messages as discussed above in step 602.

At step 636, the peer-to-peer orchestrator 122 may predict the paths of each mobile device 304 in a similar manner as discussed above in step 628 and, at step 638, adjust which mobile devices 304 are part of the group. For instance, one or more of the mobile devices 304*a-e* may be removed from the first group if those mobile devices 304 are predicted to travel along a different path from the rest of the first group. For instance, one or more mobile devices 304 may be added to the first group if those mobile devices 304 are predicted to travel along the same path as the first group. The peer-to-peer orchestrator 122 may update the map of the group based on which mobile devices 304 is a member of the group.

At step 640, the peer-to-peer orchestrator associated with the next access point may determine whether the group is at the predicted next access point. The peer-to-peer orchestrator associated with the next access point may receive an identifier of the predicted next access point from one or more of the peer-to-peer orchestrator 122 or from the mobile devices 304 in the group. As discussed above, upon entering a service area and connecting with an access point, the mobile device 304 may inform the peer-to-peer orchestrator 122 of an identifier of the access point to which it has connected (and, possibly, an identifier of the predicted next access point, which the mobile device 304 may have received from the peer-to-peer orchestrator 122). The peer-to-peer orchestrator 122 may compare the identifier of the access point with the identifier of the predicted next access point. If they match, the peer-to-peer orchestrator 122 may, at step 642, determine that the peer-to-peer orchestrator 122 was correct in its prediction of the next access point and cause transmission of missing asset parts to the group of mobile devices 304 via the predicted next access point using the missing asset parts that are already cached at either the predicted next access point's local memory or the nearby edge server of the predicted next access point.

Otherwise, if they do not match or if no prediction information was received, the peer-to-peer orchestrator 122 may, at step 644, determine that the peer-to-peer orchestrator 122 was not correct in its prediction of the next access point and cause transmission of missing asset parts to the group of mobile devices 304 from the content server 106 using the access point the group has established a connection.

In either case, the peer-to-peer orchestrator associated with the next access point may then proceed to repeat steps 614-644.

Figure 8:
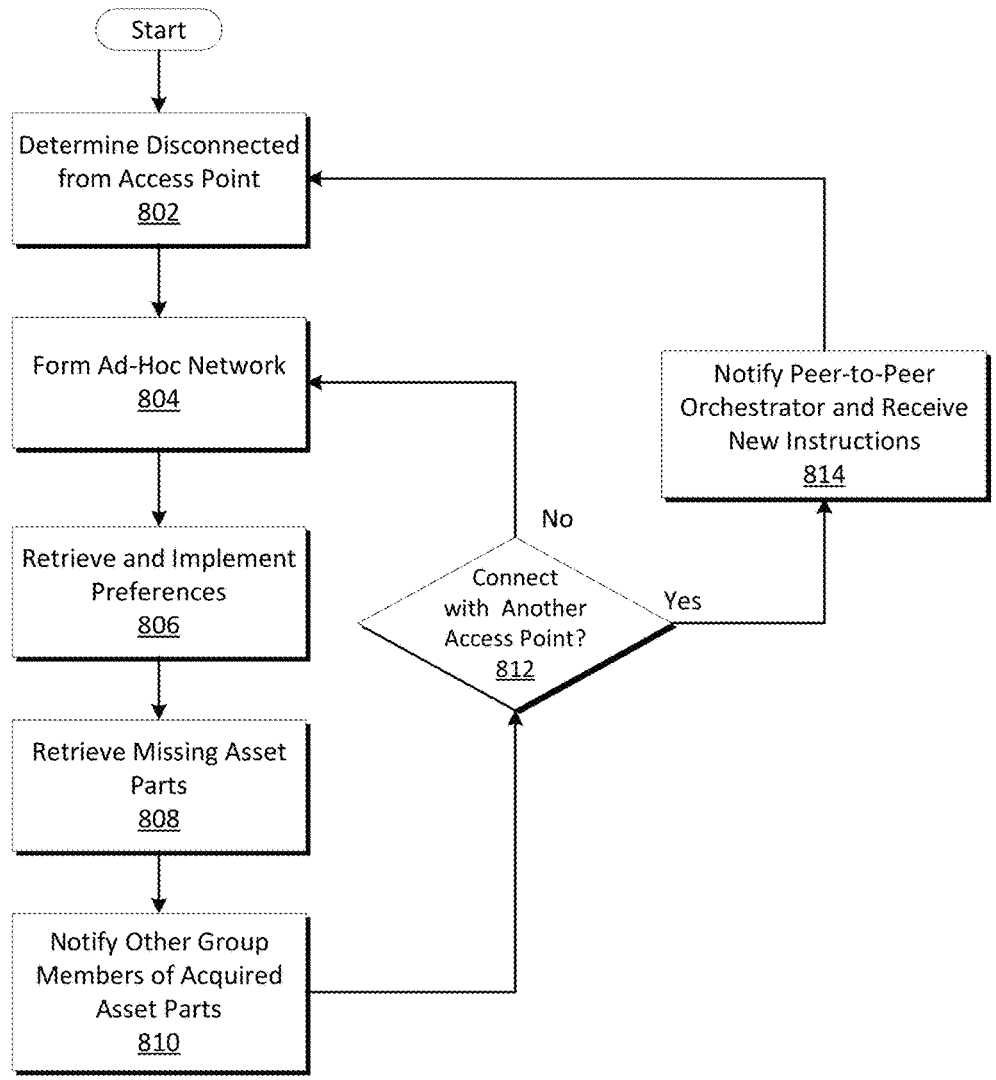
FIG. 8 depicts an illustrative method for a mobile device to retrieve an asset in the breadth-first approach for peer-to-peer file sharing in a temporary ad hoc mesh network, in accordance with one or more aspects described herein.

FIG. 8 depicts an illustrative method for a mobile device to retrieve an asset in the breadth-first approach for peer-to-peer file sharing in a temporary ad hoc mesh network, in accordance with one or more aspects described herein. The method of FIG. 8 and/or one or more steps thereof may be performed by a computing device (e.g., mobile device 304). The method illustrated in FIG. 8 and/or one or more steps thereof may be partially or fully embodied, for example, in computer-executable instructions that are stored in a computer-readable medium, such as a non-transitory computer-readable memory. In some instances, one or more of the steps of FIG. 8 may be performed in a different order and/or combined. In some instances, one or more of the steps of FIG. 8 may be omitted and/or otherwise not performed.

Prior to performing the steps of FIG. 8, a computing device (e.g., mobile device 304*a* of the first group) may, while connected to an access point (e.g., the access point 308), receive a variety of information from the peer-to-peer orchestrator 122 and/or the content server 106. For instance, the mobile device 304*a* may receive a first asset part and at least one subsequent asset part of a requested asset. The mobile device 304*a* may receive an identification of each group member and sharing preferences for each group member. The mobile device 304*a* may also receive authentication credentials for use in creating a secure ad hoc network among the group members. The mobile device 304*a* may receive a map for its group of which mobile devices 304*a-e* of the first group has which asset parts of the requested asset. Further, the mobile device 304 may receive instructions to perform the steps of FIG. 8.

At step 802, a computing device (e.g., a mobile device 304*a* of the first group) may determine that it has disconnected from an access point (e.g., the access point 308) for at least a minimum time period. For instance, as the train 306*a* departs the train station 300, the mobile device 304*a* onboard the train 306*a* may lose connectivity with the access point 308.

At step 804, the first group of mobile devices 304*a-e* may collectively form the ad hoc mesh network 400 so that each of them may communicate with one another in a secure session. For instance, each of the mobile devices 304*a-e* may broadcast a beacon with its SSID information. The other mobile devices 304*a-e* may listen for the beacon on e.g., a particular channel or sub-channel to discover other mobile devices 304*a-e* in the group and retrieve the broadcasted SSID information. If a preliminary connection between two of the mobile devices 304*a-e* are formed, they may authenticate one another using authentication credentials they provide to one another. If the credentials are authentic, an ad hoc mesh network 400 (e.g., a secure session) is formed between them. Other mobile devices 304*a-e* in the group may join the ad hoc mesh network 400 after being discovered and authenticated.

At step 806, a computing device (e.g., the mobile device 304*a*) may retrieve and implement preferences from one or more of the mobile devices 304*b-e* in the first group (if it did not already receive such preferences from the peer-to-peer orchestrator 122) and from other intermediary mobile devices 125. As discussed above, each mobile device 304 may include a mobile app installed therein that enables its user to set one or more preferences to manage its sharing of asset parts. For instance, the mobile app may permit its user to opt in to asset sharing all together and, thus, permit other mobile devices 304 to retrieve asset parts from it. If the user did not opt in, the mobile app may prevent other mobile devices 304 from retrieving asset parts from it. Other preferences include selection of a time period when asset parts stored on the mobile device 304 may be shared and/or selection of a time period when asset parts stored on the mobile device 304 might not be shared. Yet other preferences include selection of a minimum battery level of the mobile device 304 to permit sharing of asset parts stored on the mobile device 304. As a result, if the current battery level of the mobile device 304 is greater than or equal to the minimum battery level, the mobile device 304 may permit sharing of its stored asset parts. Otherwise, if the current battery level of the mobile device 304 is less than the minimum battery level, the mobile device 304 might not permit sharing of its stored asset parts in order to conserve power thereby prolonging battery life of the mobile device 304. In such an instance, the mobile device may be removed from the ad hoc mesh network 400.

At step 808, a computing device (e.g., the mobile device 304*a*) may retrieve its missing asset parts from the other mobile devices 304 (e.g., the mobile device 304*b*) in the group in accordance with their preferences. A missing asset part for a mobile device 304 may be an asset part of the requested asset not yet obtained by the mobile device 304. A missing asset part for a group may be an asset part of the requested asset not yet obtained by any mobile device 304 in the group. The list of missing asset parts may be in the form of an array and may be stored by both the group of mobile devices 304 and the peer-to-peer orchestrator 122. In some instances, the order in which asset parts missing from a mobile device 304 are to be retrieved may be specified by the peer-to-peer orchestrator 122. In some cases, the order may be the chronological order of the asset parts. If the mobile device 304*a* obtains a missing asset part, it may begin retrieving a different missing asset part from another mobile device 304*b-e* of the first group and, at step 810, may notify the other group members that it has acquired a particular asset part. The notification may include an identifier of the mobile device 304 and an identifier of the acquired asset part.

At step 812, a computing device (e.g., the mobile device 304*a*) may determine whether it has connected with another access point 308 (e.g., another train station), which may be associated with another peer-to-peer orchestrator. If not, the mobile device 304*a* may repeat the steps of 804-812. If so, the process may proceed to step 814 where the mobile device 304*a* may notify the peer-to-peer orchestrator associated with the next access point 308 of its group membership and updated map. In response, the mobile device 304*a* may receive new instructions from the peer-to-peer orchestrator associated with the next access point and act in accordance with the new instructions. The instructions may instruct the mobile device 304*a* to retrieve asset parts from particular devices and include updated group membership, map information, etc. If the mobile device again loses connection with the access point, the process may return to step 802.

In one or more additional or alternative aspects, rather than the mobile devices 304 boarding a train at a train station, the mobile devices 304 may board an airplane at an airport, a bus at a bus station, a boat at a port, or an automobile at a premises (e.g., house, business, work, etc.), or the like. For instance, the group of mobile devices 304 may be mobile devices 304 in one or more vehicles traveling along at least a portion of the same route at the same time. In some instances, the access point may be any wireless base station (e.g., Wi-Fi router of a premises, train station, bus station, airport, port, etc.).

In some examples described above, the mobile devices 304 temporarily stopped at a service area defined by an access point such as a train station or airport terminal. In other examples, the mobile devices 304 might not temporarily stop in the service area defined by the access point. That is, the mobile devices 304 may simply continue to travel through the service area defined by the access point at their typical traveling speed. As an example, an access point may be a Wi-Fi base station at a person's house near the train tracks and first group of mobile devices 304*a-e* may enter it service area for a brief period of time as the train 306*a* passes the person's house. In such instances, the Wi-Fi base station at the person's house may be the next predicted access point. Additionally, the peer-to-peer orchestrator 122 may account for a predicted time period during which the first group of mobile devices 304*a-e* will have a connection with the Wi-Fi base station of the person's house based on the speed at which the first group is traveling (e.g., the speed of the train 306*a*).

Digital rights management, information lifecycle management, and encryption schemes may be used in one or more of the above-described embodiments. As an example, each asset part may include an envelope of metadata and a payload. The payload may be a binary object which may be encrypted. The envelope of metadata may provide a description of the method(s) for decoding the payload, including but not limited to key information, license requirements, nonces, etc.

While some embodiments discussed above are described with respect to a first group of mobile devices 304, each of the embodiments discussed herein may be performed for other groups of mobile devices. Similarly, while some embodiments were described with respect to a particular mobile device (e.g., the mobile device 304*a*), each of the embodiments may be performed for another mobile device 304.

While one or more aspects discussed may have been described in the context of a static group size, groups may be defined as the set of devices that share a location for a period of time. In such aspects, groups may be defined using one or more of a record of the location, start time, end time, and two mobile device identifiers. The record may be part of a join history log with a first mobile device identifier being the observer, and a second mobile device identifier being the observed. The peer-to-peer orchestrator 122, mobile devices 304, and other processing systems may form a group based on relationships in records of the join history log. As an example, one group may include the first and second mobile devices based on their location and time. References described herein to adding members to or removing members from a group may be expressed as the timestamp where the union of records with overlapping membership changes.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. A method comprising:
   receiving, by a computing device and from a plurality of mobile devices, a plurality of requests for an asset;
   determining a plurality of predicted paths for the plurality of mobile devices;
   determining a first group of one or more mobile devices of the plurality of mobile devices based on the plurality of predicted paths, wherein each of the one or more mobile devices in the first group have a same predicted path portion;
   determining, for the asset, a plurality of asset parts;
   causing transmission, via an access point and to each of the one or more mobile devices in the first group, of a different asset part of the plurality of asset parts; and
   transmitting, to each of the one or more mobile devices in the first group, one or more instructions for the first group to form an ad hoc network with other mobile devices in the first group and to retrieve missing asset parts from the other mobile devices in the first group using the ad hoc network.

2. The method of claim 1, further comprising:
receiving, from the one or more mobile devices in the first group, download status updates, wherein each download status update identifies the respective asset part transmitted to that mobile device;
generating a map indicating an association between each of the one or more mobile devices in the first group and the respective asset part transmitted to that mobile device; and
transmitting, to each of the one or more mobile devices in the first group, the map.

3. The method of claim 1, further comprising:
determining a predicted next access point the first group is most likely to encounter based on the predicted paths of each of the one or more mobile devices in the first group;
determining one or more asset parts that have not yet been downloaded by the first group; and
causing transmission of the determined one or more asset parts to a memory location associated with the predicted next access point.

4. The method of claim 3, wherein the memory location associated with the predicted next access point is an edge server that is closest to the predicted next access point.

5. The method of claim 4, further comprising:
determining that the first group has connected to the predicted next access point; and
causing transmission of the determined one or more asset parts from the memory location to the first group.

6. The method of claim 1, further comprising:
transmitting, to each of the one or more mobile devices in the first group, authentication credentials to form the ad hoc network.

7. The method of claim 1, further comprising:
receiving, by the computing device, an indication that the computing device is a predicted next access point for a second group of mobile devices;
determining that the second group of mobile devices has connected to the computing device; and
adjusting the first group to include the second group of mobile devices based on a plurality of predicted paths of each mobile device in the second group of mobile devices.

8. The method of claim 7, further comprising:
receiving, from each mobile device of the second group of mobile devices, a status update of which of the plurality of asset parts that mobile device has obtained.

9. The method of claim 8, further comprising:
updating a map based on the adjusted first group of mobile devices and the status updates received from the one or more mobile devices in the second group of mobile devices.

10. A method comprising:
receiving, by a computing device and from a plurality of mobile devices, a plurality of requests for an asset;
determining a plurality of predicted paths for the plurality of mobile devices;
determining a first group of one or more mobile devices of the plurality of mobile devices based on the plurality of predicted paths, wherein each of the one or more mobile devices in the first group have a same predicted path portion;
determining, for the asset, a plurality of asset parts;
causing transmission, via an access point and to each mobile device in the first group, of a different asset part of the plurality of asset parts;
determining a predicted next access point the first group is most likely to encounter based on the predicted paths of each of the one or more mobile devices in the first group;
determining one or more asset parts that have not yet been downloaded by the first group; and
transmitting the determined one or more asset parts to a memory location associated with the predicted next access point.

11. The method of claim 10, further comprising:
transmitting, to each of the one or more mobile devices in the first group, one or more instructions for the first group to form an ad hoc network with other mobile devices in the first group and to retrieve missing asset parts from the other mobile devices in the first group using the ad hoc network.

12. The method of claim 10, further comprising:
receiving, from the one or more mobile devices in the first group, download status updates, wherein each download status update identifies the respective asset part transmitted to that mobile device;
generating a map indicating an association between each of the one or more mobile devices in the first group and the respective asset part transmitted to that mobile device; and
transmitting, to each of the one or more mobile devices in the first group, the map.

13. The method of claim 12, further comprising:
updating the map based on additional status updates received from the one or more mobile devices in the first group.

14. The method of claim 10, further comprising:
receiving, from a particular mobile device in the first group, a user preference to permit sharing of the asset parts stored on the particular mobile device if a battery level of the particular mobile device is greater than or equal to a minimum battery level and to block sharing of the asset parts stored on the particular mobile device if the battery level of the particular mobile device is less than the minimum battery level.

15. The method of claim 10, further comprising:
determining that the first group has connected to the predicted next access point; and
causing transmission of the determined one or more asset parts from the memory location to the first group.

16. A method comprising:
transmitting, by a computing device and to an orchestrator, a request for an asset;
receiving at least one asset part of a plurality of asset parts of the asset;
receiving a map comprising a list of mobile devices and an indication of which asset parts of the asset are stored on which of the mobile devices; and
in response to determining that the computing device has lost a connection to an access point associated with the orchestrator for at least a minimum time period, forming an ad hoc network with one or more of the mobile devices in the list and retrieving asset parts missing from the computing device from the one or more of the mobile devices in the list using the ad hoc network.

17. The method of claim 16, further comprising:
in response to receiving an asset part of the asset using the ad hoc network, transmitting, to the one or more of the mobile devices in the list, a notification that the computing device has the received asset part.

18. The method of claim 16, further comprising:

in response to obtaining a connection with a particular access point, notifying an orchestrator associated with the particular access point of the connection with the particular access point.

19. The method of claim 16, further comprising:

receiving, by the computing device, a plurality of user preferences associated with sharing asset parts stored on the computing device;

permitting sharing of the asset parts stored on the computing device in accordance with the plurality of user preferences; and transmitting the plurality of user preferences to at least one of an orchestrator or a mobile device in the list.

20. The method of claim 19, wherein a user preference, of the plurality of user preferences, permits sharing of the asset parts stored on the computing device if a battery level of the computing device is greater than or equal to a minimum battery level and blocks sharing of the asset parts stored on the computing device if the battery level of the computing device is less than the minimum battery level.

* * * * *

UNITED STATES PATENT AND TRADEMARK OFFICE
CERTIFICATE OF CORRECTION

PATENT NO. : 10,051,048 B2
APPLICATION NO. : 15/179596
DATED : August 14, 2018
INVENTOR(S) : Haebler et al.

Page 1 of 1

It is certified that error appears in the above-identified patent and that said Letters Patent is hereby corrected as shown below:

Page 2, Column 1, Other Publications, Line 5:
Please delete "teh" and insert --the--

Column 11, Detailed Description, Line 62:
Delete "304 a-d, f-h," and insert --304a-d, f-h,--

Signed and Sealed this
Nineteenth Day of February, 2019

Andrei Iancu
*Director of the United States Patent and Trademark Office*